United States Patent
Hwang et al.

(10) Patent No.: US 10,547,079 B2
(45) Date of Patent: Jan. 28, 2020

(54) PORTABLE FLAME ELECTRIC GENERATION DEVICE, METAL-SUPPORTED SOLID OXIDE FUEL CELL AND MANUFACTURING METHODS THEREOF

(71) Applicant: Institute of Nuclear Energy Research, Atomic Energy Council, Executive Yuan, R.O.C., Taoyuan (TW)

(72) Inventors: Chang-Sing Hwang, Taoyuan (TW); Chun-Huang Tsai, Taoyuan (TW); Chun-Liang Chang, Taoyuan (TW); Ming-Hsiu Wu, Taoyuan (TW); Te-Jung Huang, Taoyuan (TW); Sheng-Fu Yang, Taoyuan (TW); Cheng-Yun Fu, Taoyuan (TW)

(73) Assignee: INSTITUTE OF NUCLEAR ENERGY RESEARCH, ATOMIC ENERGY COUNCIL, EXECUTIVE YUAN, R.O.C., Taoyuan (TW)

( * ) Notice: Subject to any disclaimer, the term of this patent is extended or adjusted under 35 U.S.C. 154(b) by 201 days.

(21) Appl. No.: 15/631,488

(22) Filed: Jun. 23, 2017

(65) Prior Publication Data
US 2018/0115008 A1    Apr. 26, 2018

(30) Foreign Application Priority Data
Oct. 21, 2016   (TW) .............................. 105134163 A

(51) Int. Cl.
H01M 8/2425   (2016.01)
H01M 8/124    (2016.01)

(52) U.S. Cl.
CPC .. *H01M 8/2425* (2013.01); *H01M 2008/1293* (2013.01); *H01M 2250/30* (2013.01); *H01M 2250/405* (2013.01)

(58) Field of Classification Search
None
See application file for complete search history.

(56) References Cited

U.S. PATENT DOCUMENTS

2006/0134485 A1* 6/2006 Horiuchi ................ F23D 14/10
                                                                429/441
2013/0011768 A1* 1/2013 Ahn .................... H01M 8/0637
                                                                429/506
2015/0064596 A1* 3/2015 Leah ................... H01M 4/8828
                                                                429/465

FOREIGN PATENT DOCUMENTS

JP           2006252982 A  *  9/2006

* cited by examiner

*Primary Examiner* — Daniel S Gatewood
(74) *Attorney, Agent, or Firm* — Locke Lord LLP; Tim Tingkang Xia, Esq.

(57) ABSTRACT

A portable flame electric generation device having metal-supported solid oxide fuel cells includes a furnace, a heat shield structure, a plurality of metal-supported solid oxide fuel cells and a housing structure. Each of the metal-supported solid oxide fuel cells includes a porous metal substrate, a first anode layer, a second anode layer, an anode isolation layer, an electrolyte layer, a cathode isolation layer, a cathode interface layer and a cathode current-collecting layer. The metal-supported solid oxide fuel cell is capable of quickly starting up and withstanding thermal shocks, and also liquefied fuel cartridges are applied as heating and fuel sources for transforming the CO and $H_2$ fuels into electricity via electrochemical reactions.

11 Claims, 16 Drawing Sheets

PORTABLE FLAME ELECTRIC GENERATION DEVICE, METAL-SUPPORTED SOLID OXIDE FUEL CELL AND MANUFACTURING METHODS THEREOF

CROSS REFERENCE TO RELATED APPLICATION

This application claims the benefit of Taiwan Patent Application Serial No. 105134163, filed Oct. 21, 2016, the subject matter of which is incorporated herein by reference.

BACKGROUND OF INVENTION

1. Field of the Invention

The invention relates to an electric generation device, a fuel cell and manufacturing methods for producing the same, and more particularly to a metal-supported solid oxide fuel cell, a portable flame electric generation device having the metal-supported solid oxide fuel cell, and associated manufacturing methods of the metal-supported solid oxide fuel cell and the portable flame electric generation device.

2. Description of the Prior Art

The solid oxide fuel cell is a high-efficiency and low-pollution device that generates electricity by applying an electrochemical mechanism of forming water by mixing oxygen and hydrogen or carbon monoxide (CO). In the art, a typical solid oxide fuel cell includes an electrolyte, an anode and a cathode, in which the electrolyte is made of yttria stabilized zirconia (YSZ), the anode is made of a cermet material consisted of nickel (Ni) and the YSZ, the cathode is made of $LaMnO_3$ having a perovskite structure.

Currently, according to the support component of a cell, the solid oxide fuel cells can be classified into electrolyte-supported, anode-supported (cermet-supported), cathode-supported and metal-supported solid oxide fuel cells. In order to produce a larger output power, the anode-supported (cermet-supported) and metal-supported types of the solid oxide fuel cells are usually applied. Generally, the support structure for the solid oxide fuel cell (in a plate form) requires sufficient thickness and structure toughness. In considering the electric output performance of the solid oxide fuel cell, the support structure shall provide necessary porosity so as to maintain acceptable permeability. For example, in an art, a reduction in the thickness of the support structure is usually applied directly to substantially increase the permeability of the support structure, but the toughness thereof would be traded off. Consequently, the stability for long-term operation of the solid oxide fuel cell could be influenced as well.

A conventional flame-heating solid oxide fuel cell generation apparatus usually includes anode-supported (cermet-supported) or electrolyte-supported solid oxide fuel cells. The anodes of these flame-heating cells are usually made of YSZ—Ni (Ni as a catalyst), SDC-Ni or a mixture of an oxygen ion-conducting oxide and Ni. In this aspect, since the support structure of the anode-supported (cermet-supported) or electrolyte-supported solid oxide fuel cell can't provide well thermal conductivity to meet a rapid heating situation, the flame-heating solid oxide fuel cells having such support structures would be vulnerable to cell cracking.

Further, the conventional flame-heating solid oxide fuel cell generation apparatus, usually operated under the open atmosphere, is to burn the liquefied fuel such as propane or butane for providing the heat, CO and $H_2$ for the solid oxide fuel cell to generate electricity. The fuel cell is directly heated to a work temperature less than 850° C., and electrochemical reactions occurred in the fuel cell transform the CO and $H_2$ fuels into the $CO_2$ and $H_2O$. However, because the combustion of the liquefied fuel is open to the atmosphere, the $O_2$ in the atmosphere surrounding the flame can be still utilized easily to achieve a complete combustion. Thereupon, the amounts of CO and $H_2$ to the cell are reduced. Namely, the supplies of the CO and $H_2$ to the cell, contributed by the incomplete combustion, are unstable and fluctuating, and thus the electricity generated by the flame-heating solid oxide fuel cell would be both less and unstable.

In addition, since the Ni catalyst used in the conventional flame-heating solid oxide fuel cell generation apparatus can induce carbon deposition leading eventually to jam the flows of CO and $H_2$ fuels and coat the Ni catalyst, the Ni catalyst might lose catalytic function, and thereby the electricity provided by this generation apparatus would be severely affected.

Also, since the conventional flame-heating solid oxide fuel cell generation apparatus is usually provided without relevant thermal and wind-shield structures, thus poor thermal distribution, less temperature controllability and more heat loss are usually met for this type of fuel cell generation apparatus. Further, since the solid oxide fuel cell of the conventional flame-heating solid oxide fuel cell generation apparatus is close to or contacts the high-temperature zone of the flame generated by burning a liquefied fuel such as propane or butane, the temperature distribution over the cell would be extremely inhomogeneous, from which the unexpected thermal stress leading to the potential cracking problem would be induced on the cell.

SUMMARY OF THE INVENTION

Accordingly, it is the primary object of the present invention to provide a portable flame electric generation device that includes at least one metal-supported solid oxide fuel cell to provide quick startup and to withstand possible thermal shocks. Further, liquefied fuel cartridges are applied as heating and fuel sources for transforming the CO and $H_2$ fuels into electricity via electrochemical reactions.

It is another object of the present invention to provide a manufacturing method of the portable flame electric generation device that implements the aforesaid metal-supported solid oxide fuel cell as a generation element. In addition, appropriate spacing is provided between cell and flame so as to prevent the flame to directly burn the metal-supported solid oxide fuel cell, such that the unfavorable temperature distribution and localized overheating upon the cell can be prevented and reduced.

It is a further object of the present invention to provide a manufacturing method of the metal-supported solid oxide fuel cell that can provide excellent electric properties, and introduce metal supports to ensure high thermal conductivity; such that the CO and $H_2$ fuels can be transported easily to the anode layers for undergoing electrochemical reactions to generate electricity. Also, the reaction water can be discharged out of the anode so as to enhance the output power of the solid oxide fuel cell and the utilization of fuel.

In the present invention, the portable flame electric generation device includes a furnace, a heat shield structure, a plurality of metal-supported solid oxide fuel cells and a housing structure. The furnace burns a liquefied fuel such as propane or butane to provide a flame, CO and $H_2$ fuels. The heat shield structure located above the furnace includes a plurality of first ventilation channels. The metal-supported solid oxide fuel cells mounted above the furnace is covered by the heat shield structure. An anode side of the metal-supported solid oxide fuel cell faces the flame provided by the furnace, while a cathode side thereof opposing to the anode side faces and is close to the first ventilation channels of the heat shield structure. The housing structure is to cover the heat shield structure.

In the present invention, the manufacturing method of a portable flame electric generation device includes the steps of: (a) providing a furnace equipped with a voltage/current monitor, a charging connector and necessary wirings, wherein the furnace is to provide a flame, CO and $H_2$ fuels; (b) disposing a plurality of metal-supported solid oxide fuel cells to surround the flame provided by the furnace; (c) disposing a heat shield structure to cover the metal-supported solid oxide fuel cells, wherein the heat shield structure includes a plurality of first ventilation channels, an anode side of each said metal-supported solid oxide fuel cell facing the flame, a cathode side of each said metal-supported solid oxide fuel cell facing and being close to the first ventilation channels of the heat shield structure; and (d) disposing a housing structure to cover the heat shield structure, wherein the housing structure includes a plurality of second ventilation channels.

In the present invention, the metal-supported solid oxide fuel cell includes a porous metal substrate, a first anode layer, a second anode layer, an anode isolation layer, an electrolyte layer, a cathode isolation layer, a cathode interface layer and a cathode current-collecting layer. The porous metal substrate is formed of a porous plate body and a porous surface layer. The porous plate body and the porous surface layer formed of their particles by sintering have the plurality of tortuous gas channels inside. The tortuous gas channels are formed by connecting the voids between the particles of the porous plate body or the porous surface layer. Additionally, the porous plate body has a plurality of straight gas channels that do not penetrate the porous plate body. The porous surface layer is located over the porous plate body. The first anode layer is located over the porous surface layer of the porous metal substrate. The second anode layer is located over the first anode layer, wherein the second anode layer is a nano porous structure. The anode isolation layer is located over the second anode layer. The electrolyte layer is located over the anode isolation layer, wherein a material of the electrolyte layer includes lanthanum strontium gallium magnesium oxide (LSGM) and a sintering aid with an amount less than 1.5 wt %. The cathode isolation layer is located over the electrolyte layer. The cathode interface layer is located over the cathode isolation layer. The cathode current-collecting layer is located over the cathode interface layer.

In the present invention, the manufacturing method of a metal-supported solid oxide fuel cell includes the steps of: (1) providing a porous metal substrate; (2) preparing raw material powders; (3) dividing the raw material powders into a plurality of powder groups by sieving raw material powders; and (4) forming orderly a first anode layer, a second anode layer, an anode isolation layer, an electrolyte layer, a cathode isolation layer, a cathode interface layer and a cathode current-collecting layer on a porous surface layer of the porous metal substrate by an atmosphere plasma spraying process.

As stated above, the metal-supported solid oxide fuel cell of the present invention is used to be a element for generating electricity, and the number of the aforesaid fuel cells in the portable flame electric generation device can be one, two or plural. If the number of the fuel cells is more than two, then these metal-supported solid oxide fuel cells can be connected in series or in parallel, per requirements. Also, each of the fuel cells is spaced from the flame by a predetermined distance so as to prevent the high temperature bright zone of flame to contact and burn the metal-supported solid oxide fuel cell directly. Thus, heat distribution across the fuel cell can be relatively uniform, and possible localized overheating at specific location on the fuel cell can be avoided.

Further, the metal-supported solid oxide fuel cell of the present invention, applied to the portable flame electric generation device, can be quickly started up within 20 minutes and withstand thermal shocks. After the metal-supported solid oxide fuel cell incorporates with the flame as a heat source, the CO and $H_2$ fuels contributed from an incomplete combustion of the liquefied fuel such as propane or butane can be directly transformed into electric energy via electrochemical reactions. Hence, the shortcoming of slow heating up in the conventional anode-supported (cermet-supported) solid oxide fuel cell can thus be avoided.

In addition, the portable flame electric generation device of the present invention can use a small-sized portable liquefied gas cartridge as the fuel and heat source and/or a convenient container of liquefied gas as the fuel and heat source. By providing the metal-supported solid oxide fuel cells, the chemical energy of the CO and $H_2$ fuels can be transformed into electric power via the electrochemical reactions. Then, a voltage converter can be applied to transform the electric power of cells into the voltage suitable for various 3C products. Obviously, the portable flame electric generation device of the present invention can be conveniently applied outdoors (in a camping field for example), and can be adopted as a charging station for illumination or communication devices.

Further, the heat shield structure of the present invention that has a thermal heat resistance to reduce the heat loss from the region encircled by the metal-supported solid oxide fuel cells. Also, by having the heat shield structure, the temperature distribution of the metal-supported solid oxide fuel cell can be well kept to a relatively uniform state. Thereupon, the temperature of the metal-supported solid oxide fuel cell can be controlled more easily, and the work temperature of the metal-supported solid oxide fuel cell can be quickly elevated to achieve a better performance.

Furthermore, the housing structure of the present invention is located exteriorly to the heat shield structure, such that the disadvantage effect of the power fluctuations caused by different wind conditions can be reduced to a minimum. Herein, the heat shield structure is made up by a thermal insulation material applicable to an environmental temperature less than 1000° C. In particular, by having the housing structure to be made of a metallic material, a thermal insulation structure adhered to inner walls of the metallic housing structure is recommended additionally to further reduce the temperature of metallic housing structure so that operators or any personnel can touch the housing structure in a short time.

In addition, since the second anode layer of the metal-supported solid oxide fuel cell is a nano porous structure that has larger triple-phase boundaries (TPB), thus the fuel can be efficiently utilized to generate electricity, such that the total generated electricity can be raised.

Also, in the metal-supported solid oxide fuel cell of the present invention, in order to improve conductivity and airtightness (denseness) of the electrolyte layer, the LSGM electrolyte material ($La_{0.8}Sr_{0.2}Ga_{0.8}Mg_{0.2}O_{3-\delta}$) with high conductivity is used. In addition, a small amount of sintering aids ($Li_2O$ for example) is added into the LSGM electrolyte particles, then the liquid phase sintering method is utilized to significantly enhance the airtightness of the LSGM electrolyte layer during melting the LSGM electrolyte particles and forming the LSGM electrolyte layer by the high temperature plasma flame. Thereupon, the electric generating efficiency of the metal supported solid oxide fuel cell using this LSGM electrolyte layer can be greatly improved.

In addition, the manufacturing method of the metal-supported solid oxide fuel cell (SOFC) in accordance with the present invention is not a conventional sintering process, but an atmosphere plasma spraying process to produce the metal-supported solid oxide fuel cell, such that better interlayer binding strength and capabilities of quick startup as well as withstanding thermal-shock can be obtained.

Further, in the portable flame electric generation device of the present invention, a plurality of metal-supported solid oxide fuel cells, a plurality of high temperature plates (such as SOFC interconnect plates made of ferritic metals containing Cr, ceramic plates made of $Al_2O_3$ or $ZrO_2$, or any the like) and a ceramic adhesive can be used to construct a 3D structure, for instance a 3D structure with a ⊓-shape vertical cross section. Herein, the ceramic adhesive can serve both connection and sealing functions. The fuel cells, high temperature plates and ceramic adhesive used to define a 3D structure can minimize possible leakage of the CO and $H_2$ fuels used for electricity generation to the exterior region of this 3D structure. Thereupon, the generated electric power of the portable flame electric generation device of the present invention can be substantially enhanced. In this arrangement, the anode side of each metal-supported solid oxide fuel cell is to face the flame provided by the furnace, and the cathode side thereof opposing to the anode side is to face and be close to the corresponding first ventilation channels of the heat shield structure.

All these objects are achieved by the portable flame electric generation device, the metal-supported solid oxide fuel cell and the manufacturing methods thereof described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a portable flame electric generation device, a metal-supported solid oxide fuel cell and manufacturing methods thereof. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

It shall be understood that, in the following description, the term "nano" stands for a size less than 100 nm, the term "submicron" stands for a size between 100 nm and 500 nm, and the term "micron" stands for a size between 0.5 μm and 10 μm.

Figure 1:
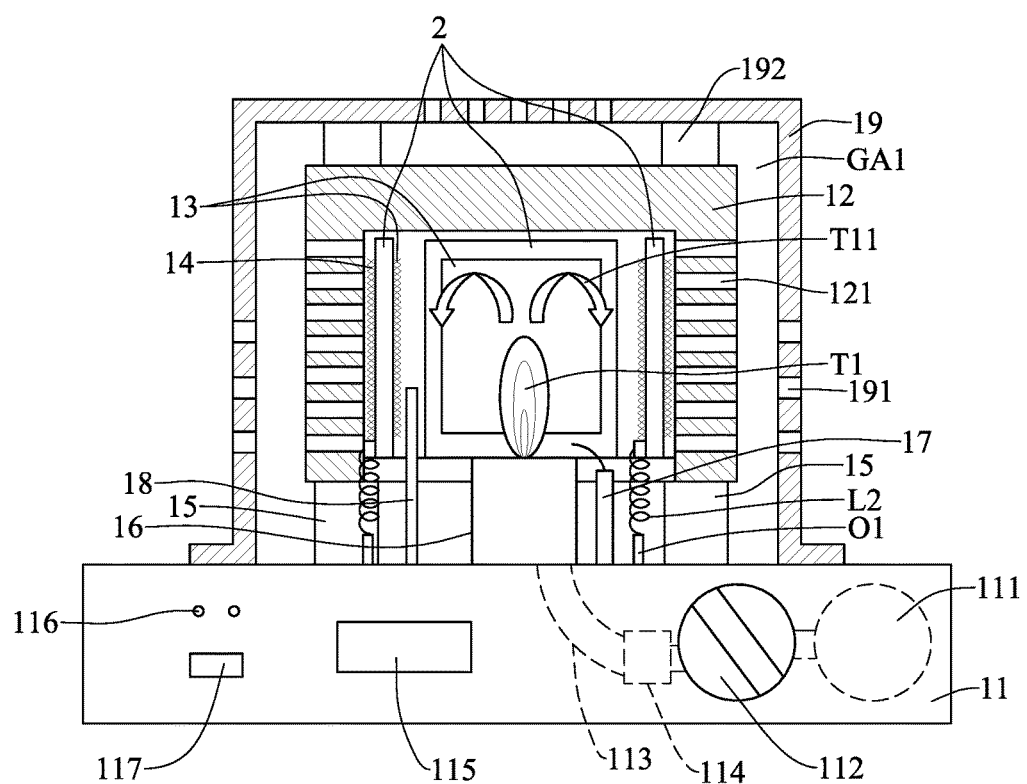
FIG. 1 is a schematic view of the preferred portable flame electric generation device in accordance with the present invention.

Referring now to FIG. 1, a schematic view of the preferred portable flame electric generation device in accordance with the present invention is shown.

In this embodiment, the portable flame electric generation device 1 includes at least a plurality of metal-supported solid oxide fuel cells 2, a furnace 11, a heat shield structure 12, a metallic anode current collector 13, a metallic cathode current collector 14, a support structure 15, a base 16, an igniter 17, a thermometer 18 and a housing structure 19. The furnace 11 further includes a voltage/current monitor 115, a plurality of charging connectors (a plug-type charging connector 116 and a USB charging connector 117 shown in the figure) and necessary wiring.

The furnace 11 for providing a flame T1 can include a fuel tank 111, a control switch 112, a fuel delivery device 113, an air mixer 114, a voltage/current monitor 115, the plug-type charging connector 116 and the USB charging connector 117. It shall be noted that the furnace of the present invention is simply a device to provide a flame, not limited to the aforesaid assembly.

The fuel tank 111 is to provide a fuel, such as butane, propane, ethane, methane or any fuel that can be ignited in the atmosphere. In addition, a water tank or container can be introduced to mix the gas fuel (butane for example) and water steam (i.e. to humidify the fuel), such that the carbon deposits can be removed more easily.

In this embodiment, the fuel tank 111 can have, but not limited to, a small-sized portable liquefied gas cartridge as a heat source, and a portable container of liquefied gas as a fuel source. In addition, the fuel tank 111 can be, but not limited to be, single-canned. In other embodiments of the present invention (not shown herein), the fuel tank 111 can be structured to have multiple cans for providing fuel.

The fuel tank 111 is connected with a fuel delivery device 113 equipped with a flowmeter for detecting the flow rate of the fuel supplied by the fuel tank 111.

The control switch 112 is to perform ignition and to control the flow rate of the fuel.

The air mixer 114, located close to fuel delivery device 113, is to mix a relevant amount of air with the fuel in the fuel delivery device 113.

The voltage/current monitor 115 is to display information such as an output voltage, an environmental temperature of the metal-supported solid oxide fuel cell 2, a flow rate of the fuel, and some optional data. For example, the flowmeter inside the fuel delivery device 113 can measure the flow rate of the fuel, and then the detected flow rate of the fuel by the flowmeter can be shown on the voltage/current monitor 115.

Regarding the power output, the furnace 11 can have variant types of charging connectors to meet users' charging needs. In this embodiment, these charging connectors include, but not be limited to include, one plug-type charging connector 116 and one USB charging connector 117.

The heat shield structure 12, located above the furnace 11, includes a plurality of first ventilation channels 121. In practice, the amount and locations of the first ventilation channels are determined per requirements. Plural first ventilation channels 121 of the heat shield structure 12 are constructed to the sides facing and close to the cathodes of solid oxide fuel cells to allow oxygens in the air reaching the cathodes. As shown in FIG. 1, these are the lateral sides of the heat shield structure 12. In this preferred embodiment, at least one metal-supported solid oxide fuel cell 2 is mounted above the furnace 11, surrounds the flame T1, and is covered by the heat shield structure 12. The metallic anode current collector 13 and the metallic cathode current collector 14 are located to an anode side and a cathode side of the corresponding metal-supported solid oxide fuel cell 2, respectively. The anode side of the metal-supported solid oxide fuel cell 2 is the side that faces the flame T1 provided by the furnace 11. The flow of the CO and $H_2$ inside the heat shield structure 12 follows an air-flow direction T11 as shown in FIG. 1. The cathode side of the metal-supported solid oxide fuel cell 2 faces and is close to the first ventilation channel 121 of the heat shield structure 12.

Practically, the metal-supported solid oxide fuel cells 2 are located inside the heat shield structure 12 at positions surrounding the flame T1 provided by the furnace 11, or at positions surrounding and above the flame T1. A gap is carefully selected between the metal-supported solid oxide fuel cell 2 and the flame T1. In the present invention, a plurality of the metal-supported solid oxide fuel cells 2 can be mounted to surround the flame T1 that is centrally located inside the heat shield structure 12. In the present invention, inside the heat shield structure 12, various arrangements of the metal-supported solid oxide fuel cells 2 can be made. Following are some of these arrangements, elucidated by accompanying figures.

Referring now to FIG. 2A through FIG. 2F, various embodiments of the arrangements of the metal-supported solid oxide fuel cells 2 inside the heat shield structure 12 are shown.

Figure 2A:
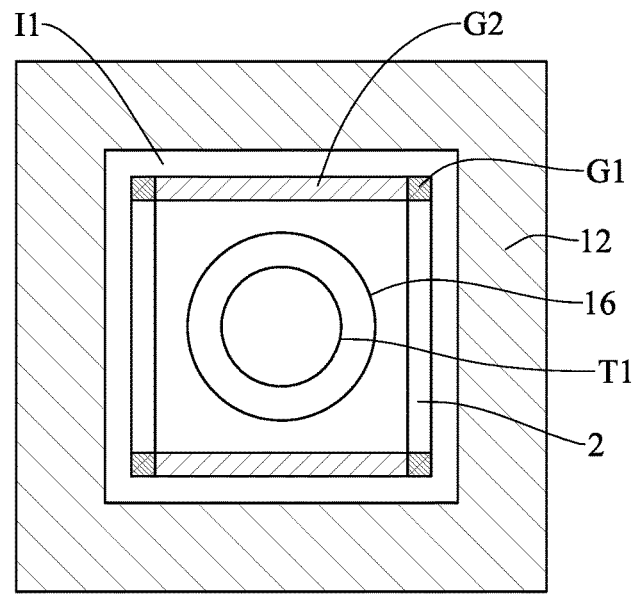
FIG. 2A is a schematic view of a first embodiment of the arrangement of the metal-supported solid oxide fuel cell and the heat shield structure in accordance with the present invention.

As shown in FIG. 2A, the heat shield structure 12 is shaped to be a hollow tetragonal cover structure for providing a space I1 for the flame T1 that is located at a center of the heat shield structure 12, and two metal-supported solid oxide fuel cells 2 are mounted inside the heat shield structure 12 by standing oppositely with respect to the flame T1. These two separate metal-supported solid oxide fuel cells 2 are connected by a high temperature ceramic adhesive G1 and high temperature ceramic plates G2 (the high temperature is less than 1300° C.) so as to form a semi-sealed structure that allows air to enter from the bottom of this structure. The high temperature ceramic adhesive G1 and ceramic plates G2 are applied to minimize possible leakages of the CO and $H_2$ fuels that are used for generating electricity. In the present invention, the high temperature ceramic plates G2 can be $Al_2O_3$ or $ZrO_2$ ceramic plates.

Figure 2B:
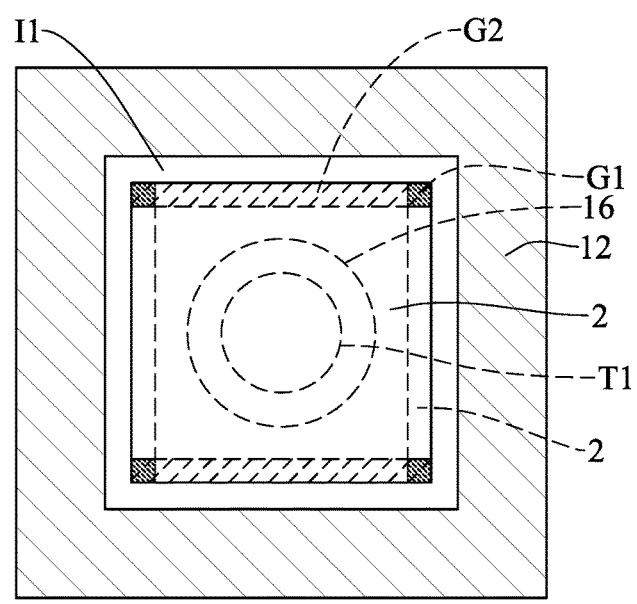
FIG. 2B is a schematic view of a second embodiment of the arrangement of the metal-supported solid oxide fuel cell and the heat shield structure in accordance with the present invention.

As shown in FIG. 2B, one major difference between the first embodiment of FIG. 2A and the second embodiment of FIG. 2B is that the second embodiment includes one more metal-supported solid oxide fuel cell 2. This additional metal-supported solid oxide fuel cell 2 is located above the top of flame T1.

Further, the additional metal-supported solid oxide fuel cell 2 above the top of flame T1 can be connected at edges to other metal-supported solid oxide fuel cells 2 and the high temperature ceramic plates G2 with the high temperature ceramic adhesive G1.

Figure 2C:
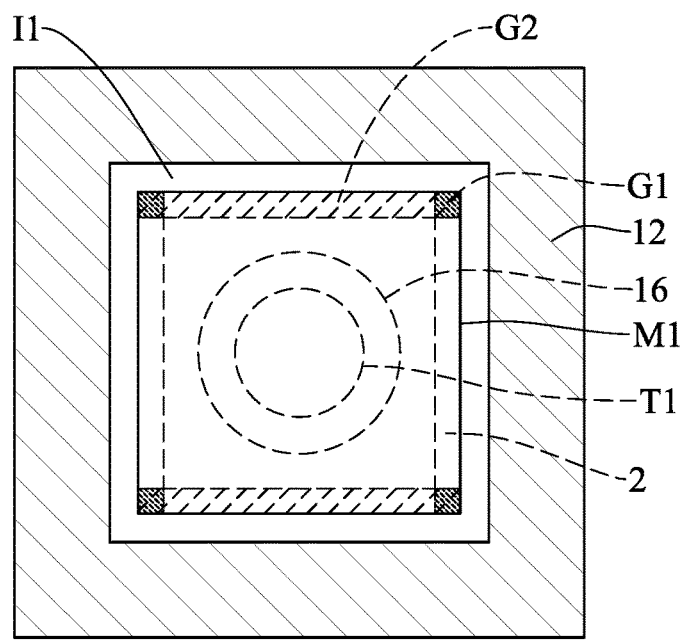
FIG. 2C is a schematic view of a third embodiment of the arrangement of the metal-supported solid oxide fuel cell and the heat shield structure in accordance with the present invention.

As shown in FIG. 2C, one major difference between the first embodiment of FIG. 2A and the third embodiment of FIG. 2C is that the third embodiment further includes a top metal plate M1 located over the flame T1 provided by the furnace 11. The top metal plate M1 can be a metal plate made of a material such as crofer 22, ZMG232, or any ferritic stainless steel containing Cr, such that the material properties such as thermal expansion coefficient, high temperature mechanical strength, anti-oxidant capability and so on, can meet requirements of the solid oxide fuel cell (SOFC). Similarly, the high temperature ceramic adhesive G1 acting as a sealant can be applied to surround the top metal plate M1 so as to connect with the two metal-supported solid oxide fuel cells 2 and the two high temperature ceramic plates G2 located below.

Figure 2D:
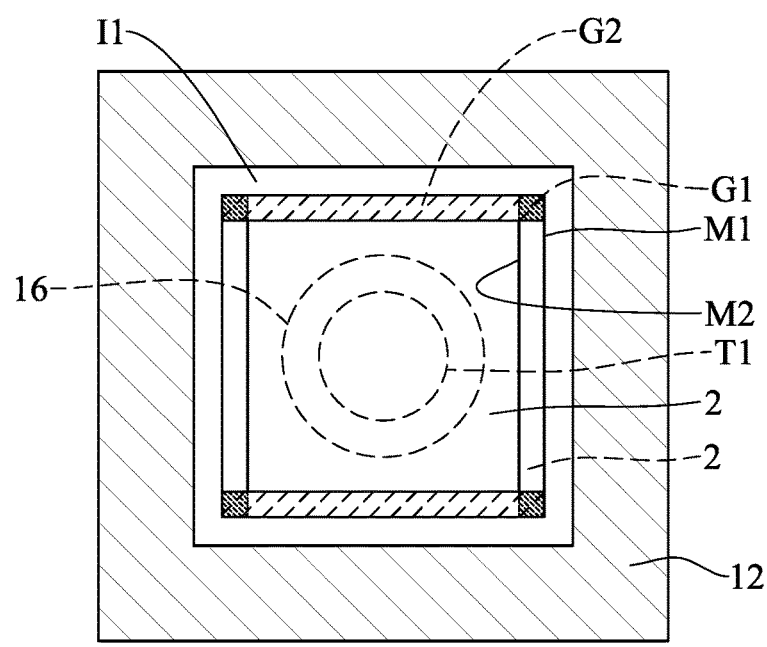
FIG. 2D is a schematic view of a fourth embodiment of the arrangement of the metal-supported solid oxide fuel cell and the heat shield structure in accordance with the present invention.

As shown in FIG. 2D, one major difference between the fourth embodiment of FIG. 2D and the third embodiment of FIG. 2C is that, in the fourth embodiment, the top metal plate M1 further includes an M2 space. The M2 space can be an excavated space on the top metal plate M1 for mounting another metal-supported solid oxide fuel cell 2. Namely, an additional metal-supported solid oxide fuel cell 2 is mounted in the M2 space above the top of the flame T1.

Figure 2E:
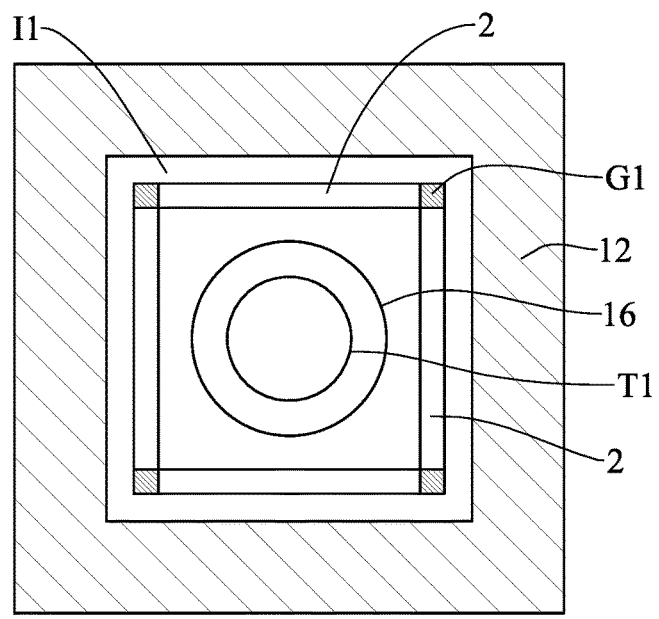
FIG. 2E is a schematic view of a fifth embodiment of the arrangement of the metal-supported solid oxide fuel cell and the heat shield structure in accordance with the present invention.

As shown in FIG. 2E, one major difference between the first embodiment of FIG. 2A and the fifth embodiment of FIG. 2E is that, in the fifth embodiment, four metal-supported solid oxide fuel cells 2 are located inside the heat shield structure 12. These four metal-supported solid oxide fuel cells 2 are structurally connected by the high temperature ceramic adhesive G1 so as to form a square to surround the flame T1.

Further, in an embodiment not shown herein, an additional metal-supported solid oxide fuel cell 2 can be located above the flame T1 and connected to the four metal-supported solid oxide fuel cells 2 shown in FIG. 2E by the high temperature ceramic adhesive G1. Alternatively, in this embodiment, the aforesaid additional metal-supported solid oxide fuel cell 2 can be replaced by the top metal plate M1 of FIG. 2C. Further alternatively, the aforesaid additional metal-supported solid oxide fuel cell 2 can be replaced by the top metal plate M1 of FIG. 2D having an M2 space to mount the fifth metal-supported solid oxide fuel cell 2. Certainly, in all the foregoing embodiments and alternatives, the high temperature ceramic adhesive G1 shall be applied to ensure the structural connections among the metal-supported solid oxide fuel cells 2, and/or between each metal-supported solid oxide fuel cell 2 and the top metal plate M1.

Figure 2F:
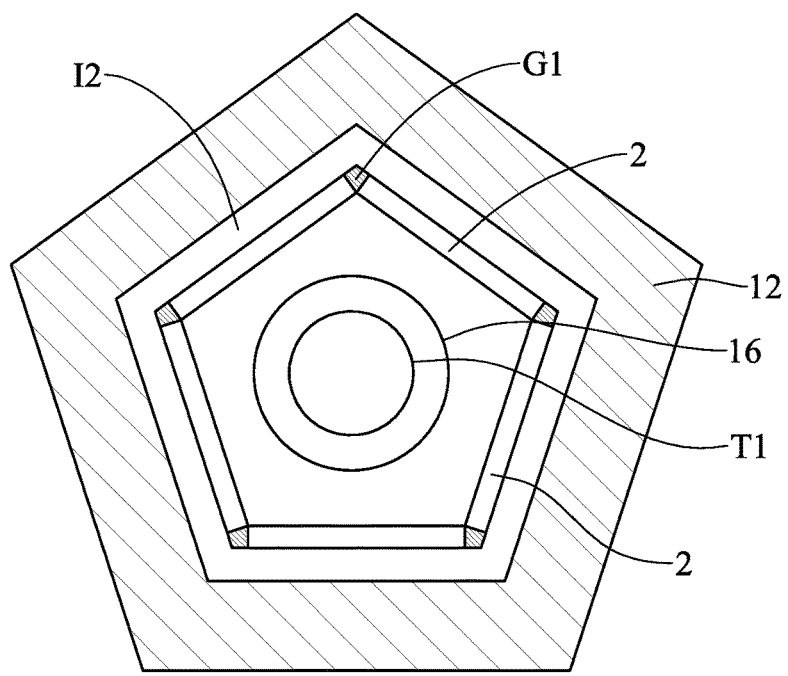
FIG. 2F is a schematic view of a sixth embodiment of the arrangement of the metal-supported solid oxide fuel cell and the heat shield structure in accordance with the present invention.

As shown in FIG. 2F, the heat shield structure 12 of the sixth embodiment is shaped to be a hollow pentagonal cover structure for providing a space I2 to locate the flame T1 and the metal-supported solid oxide fuel cells 2 that surround the flame T1. In this embodiment, five metal-supported solid oxide fuel cells 2 are included inside the space I2 of heat shield structure 12. These five metal-supported solid oxide fuel cells 2 forming a pentagon to circle the flame T1 can be structurally connected with the high temperature ceramic adhesive G1 acting as a sealant. Similarly, in an embodiment not shown herein, a top metal plate resembled to that M1 of FIG. 2C can be included and located above the flame T1 as well as the five metal-supported solid oxide fuel cells 2. Definitely, this top metal plate shall be pentagonally shaped so as to relevantly top the five metal-supported solid oxide fuel cells 2 of FIG. 2F. In addition, the high temperature ceramic adhesive G1 can be applied to ensure the structural connections of the metal-supported solid oxide fuel cells 2 and the top metal plate. Further, similar to the top metal plate M1 of FIG. 2D, the top metal plate herein can also have an M2 space to receive an additional metal-supported solid oxide fuel cell 2. Thereupon, the number of the metal-supported solid oxide fuel cells 2 in this embodiment can be increased to six.

In addition, in all the embodiments of FIG. 2A through FIG. 2F, the high temperature ceramic adhesive G1 acting as a sealant are appropriately applied to assure structural connections of the metal-supported solid oxide fuel cells 2 that are connected electrically in series. However, it shall be understood that the present invention is not limited to the aforesaid illustrated embodiments. In some embodiments not shown herein, the metal-supported solid oxide fuel cells 2 in the heat shield structure 12 can also be connected electrically in parallel.

Figure 3A:
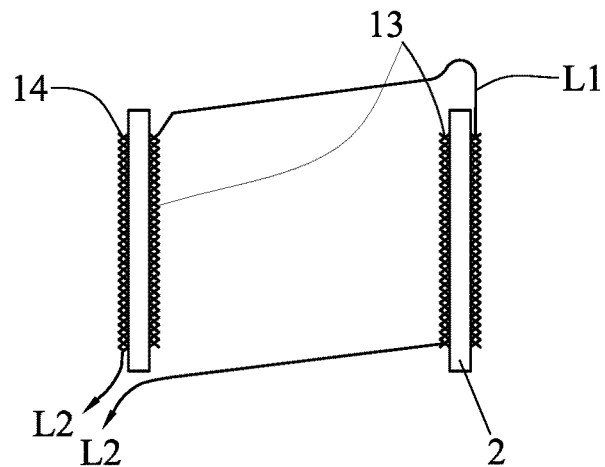
FIG. 3A is a schematic view of a first embodiment of the series connection of the metal-supported solid oxide fuel cells in accordance with the present invention.
Figure 3B:
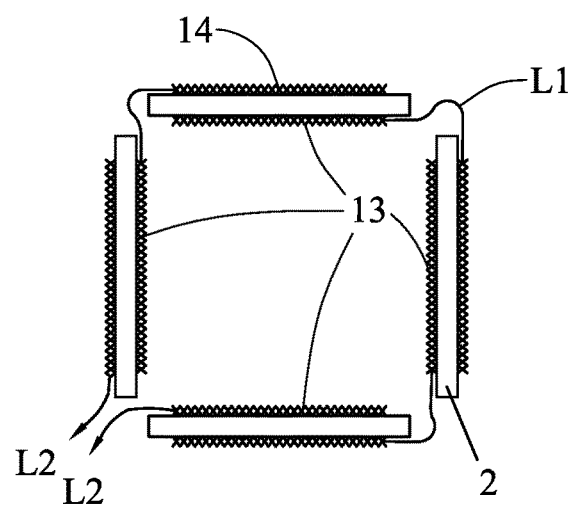
FIG. 3B is a schematic view of a second embodiment of the series connection of the metal-supported solid oxide fuel cells in accordance with the present invention.

Referring now to FIG. 3A and FIG. 3B, schematic views of a first embodiment and a second embodiment of the series connection of the metal-supported solid oxide fuel cells in accordance with the present invention are shown, respectively. To concisely explain the present invention, the high temperature ceramic adhesive G1 are removed from the figures. Details of the high temperature ceramic adhesive G1 have been provided previously by accompanying FIG. 2A through FIG. 2F.

As shown in FIG. 3A, the anode side of each metal-supported solid oxide fuel cell 2 is installed with a metallic anode current collector 13, while the cathode side of each metal-supported solid oxide fuel cell 2 is installed with a metallic cathode current collector 14. Namely, the metallic anode current collector 13 and the metallic cathode current collector 14 are mounted to opposing sides of the metal-supported solid oxide fuel cell 2. In the present invention, the metallic anode current collector 13 can be a nickel mesh, and the metallic cathode current collector 14 can be a silver mesh. The two separate metal-supported solid oxide fuel cells 2 are connected in series by the connection wire L1, i.e. one end of the connection wire L1 is connected to the anode of one cell 2, while another end of the connection wire L1 is connected to the cathode of another cell 2. In addition, the electric power outputs of the cell assemblies, as shown in FIG. 3A and FIG. 3B, are provided by the connection wires L2. One L2 wire is connected to the cathode current collector 14 of one cell 2, while the other L2 wire is connected to the anode current collector 13 of other cell 2. In the present invention, the connection wires L1 and L2 can be nickel wires, silver wires or platinum wires.

As shown in FIG. 3B, four metal-supported solid oxide fuel cells 2 are connected in series. The wiring of FIG. 3B is resembled to that of FIG. 3A. According to the wiring methodology in the art, in some other embodiments, a plurality of the metal-supported solid oxide fuel cells 2 can be connected in series, or even in parallel.

Figure 4A:
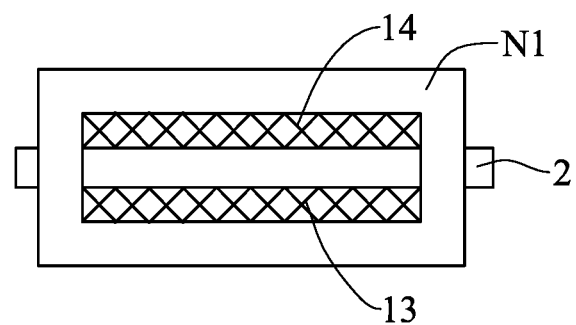
FIG. 4A is a schematic top view of an assembly of the metal-supported solid oxide fuel cell in accordance with the present invention.
Figure 4B:
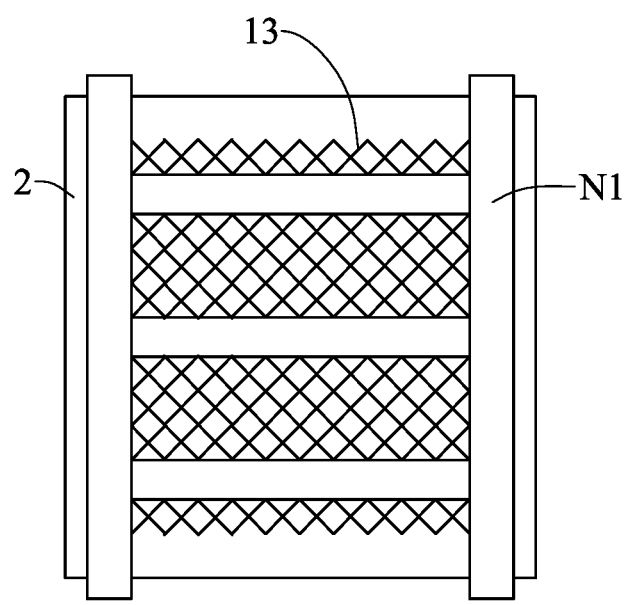
FIG. 4B is a schematic front view of FIG. 4A.

Refer now to FIG. 4A and FIG. 4B; where FIG. 4A is a schematic top view of an assembly of the metal-supported solid oxide fuel cell in accordance with the present invention, and FIG. 4B is a schematic front view of FIG. 4A.

In this embodiment illustrated by FIG. 4A and FIG. 4B, a mesh holder N1 is provided to mount the metallic anode current collector 13 and the metallic cathode current collector 14 to the anode side and the cathode side of the metal-supported solid oxide fuel cell 2, respectively.

In this embodiment, the mesh holder N1 can be made up of a plurality of $Al_2O_3$ strips that are non-conductive. By properly arranging the plurality of $Al_2O_3$ strips, the metallic anode current collector 13 and the metallic cathode current collector 14 can be fixedly located. While in forming the mesh holder N1, a high temperature ceramic adhesive G1 can be applied to bind the $Al_2O_3$ strips together. However, the introduction of the mesh holder N1 is only one of many means to fix the metallic anode current collector 13 and the metallic cathode current collector 14 to the metal-supported solid oxide fuel cell 2. In practice, there are still many other means available and well known to the art that can be applied to fulfill the aforesaid mounting.

In the present invention, the number of the metal-supported solid oxide fuel cells 2 in the heat shield structure 12 can be varied according to the configuration of the heat shield structure 12. In addition, the electric connection of the metal-supported solid oxide fuel cells 2 in the heat shield structure 12 can be in series or in parallel, and the structural connection between the metal-supported solid oxide fuel cells can apply the high temperature ceramic adhesive G1 so as to avoid possible leakages of the CO and $H_2$ gases for electricity generation. Further, an additional metal-supported solid oxide fuel cell 2 can be included at the position above the flame T1 so as to increase the number of the metal-supported solid oxide fuel cells 2 in the heat shield structure 12, and thus to promote the generated power and efficiency of the portable flame electric generation device 1.

Now, refer back to FIG. 1. In this embodiment, the power output connection wires L2 of metal-supported solid oxide fuel cells 2 are electrically connected to the corresponding output connectors O1.

The support structure 15 on the furnace 11 is located at the position between the heat shield structure 12 and the furnace 11. With the support structure 15, the heat shield structure 12 and the metal-supported solid oxide fuel cells 2 can be located over the furnace 11.

The base 16 located on the furnace 11 is connected to the fuel delivery device 113. The base 16 is to convey the fuel inside the fuel delivery device 113 into the heat shield structure 12 (i.e. into the internal empty space). On the other hand, the igniter 17 is electrically connected with the control switch 112. When the control switch 112 activates the igniter 17, a spark is generated between the igniter 17 and the base 16 so that a flame T1 is generated inside the heat shield structure 12 by burning the fuel. In this embodiment, the flame T1 is a single flame. However, in some other embodiments, multiple flames can be applied to generate electricity.

Further, the thermometer 18 located on the furnace 11 is used to detect the environmental temperature around the metal-supported solid oxide fuel cell, and the detected environmental temperature would be displayed on the voltage/current monitor 115.

The housing structure 19 covering the heat shield structure 12 is used to perform as a wind shield structure for reducing the wind influence on cell's performance. The material for the housing structure 19 is not limited to any specific material, according to the present invention. When the housing structure 19 is metallic, the housing structure 19 may include an inner lining formed of a thermal insulation material.

In addition, the housing structure 19 further includes a plurality of second ventilation channels 191 and a plurality of pad structures 192. The pad structure 192 is located between the housing structure 19 and the heat shield structure 12 so as to form a gap GA1 between the housing structure 19 and the heat shield structure 12. The gap GA1 is used to provide a thermal heat resistance between the housing structure 19 and the heat shield structure 12 so that the heat absorbed by the housing structure 19 from the heat shield structure 12 is reduced. Through the second ventilation channels 191 of the housing structure 19, the air outside the housing structure 19 can be introduced into the housing structure 19, and further flows to the cathode of the metal-supported solid oxide fuel cell 2 via the first ventilation channels 121 of the heat shield structure 12, such that the oxygen of the air can be provided to the cathode. Namely, the air required by the cathode of the metal-supported solid oxide fuel cell 2 is provided by flowing through the second ventilation channels 191, the gap GA1, the first ventilation channels 121, and finally to the cathode of the metal-supported solid oxide fuel cell 2. Thus, the locations of the second ventilation channels 191 of the housing structure 19 and those of the first ventilation channels 121 of the heat shield structure 12 shall be determined according to the positions of the metal-supported solid oxide fuel cells 2. For example, in the case as shown in FIG. 1, the plural metal-supported solid oxide fuel cells 2 are located to surround the flame T1, then the second ventilation channels 191 of the housing structure 19 and the first ventilation channels 121 of the heat shield structure 12 shall be constructed at places that are closer to the cathodes of the corresponding metal-supported solid oxide fuel cells 2. Thereupon, the air, especially the oxygen in the air, can be efficiently transmitted to the cathodes of the metal-supported solid oxide fuel cells 2.

Upon the aforesaid arrangements in accordance with the present invention, the portable flame electric generation device 1 having the metal-supported solid oxide fuel cells 2 is an innovative electric power generation apparatus. The metal-supported solid oxide fuel cells 2 can be heated quickly by the flame T1, can withstand thermal shocks excellently due to a high thermal conductivity of cell's metal support, and can efficiently consume the CO and $H_2$ fuels to generate electricity in an electrochemical way due to the high permeability of cell's metal support and the high oxygen ion conductivity of cell's LSGM electrolyte. More advantages are provided by this invention, and the aforesaid shortcoming of cracking the anode-supported (cermet-supported) solid oxide fuel cell due to unexpected thermal stress can be substantially avoided.

In addition, the portable flame electric generation device 1 can use a small-sized portable liquefied gas cartridge as the fuel source and/or a convenient container of liquefied gas as the fuel source. By providing the metal-supported solid oxide fuel cells 2, electric power via the electrochemical reactions are generated by consuming this kind of fuel. Then, a voltage converter can be applied to transform the electric power into the voltage suitable for various 3C products. Obviously, the portable flame electric generation device 1 of the present invention can be conveniently applied outdoors (in a camping field for example), and can be adopted as a charging station for illumination or communication devices.

Further, the heat shield structure 12 that has a thermal heat resistance can reduce the heat loss from the region encircled by the metal-supported solid oxide fuel cells. Also, by having the heat shield structure 12, the temperature distribution of the metal-supported solid oxide fuel cell 2 can be well kept to a relatively uniform state. Upon such an arrangement, the temperature of the metal-supported solid oxide fuel cell 2 can be controlled more easily, and the work temperature of the metal-supported solid oxide fuel cell 2 can be quickly elevated to achieve a better performance.

Furthermore, in the preferred embodiment, the housing structure 19 acting as a wind shield is located exteriorly to the heat shield structure 12, such that the disadvantage effect of the power fluctuations caused by different wind conditions can be reduced to a minimum. In particular, by having the housing structure 19 to be made of a metallic material and by having a thermal insulation structure adhered to inner walls of the housing structure 19, operators or any personnel can be protected from direct touching the heat shield structure. Also, by providing the thermal insulation structure adhered to inner walls of metallic housing structure 19, the surface temperature of the housing structure can be maintained in a state that any personnel can touch the housing structure in a short time.

Figure 5A:
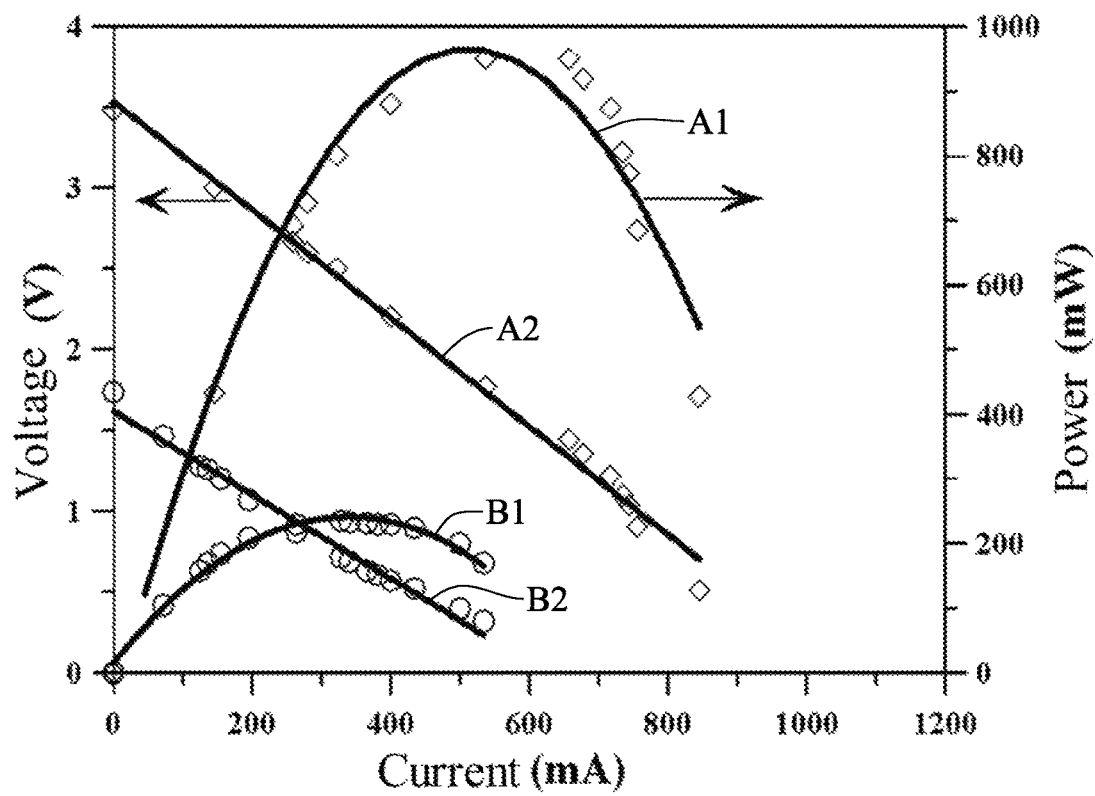
FIG. 5A shows the electric performances of different embodiments (as shown in FIG. 2A and FIG. 2E) of the portable flame electric generation device in accordance with the present invention.

Referring now to FIG. 5A, a chart of electric performances of different embodiments of the portable flame electric generation device in accordance with the present invention is shown.

In FIG. 5A, the sample device model for testing is the preferred embodiment of the portable flame electric generation device 1 shown in FIG. 1, and two sample arrangements of the metal-supported solid oxide fuel cells 2, as shown in FIG. 2A and FIG. 2E, are applied individually for testing.

In the sample device model, referred to FIG. 1, the fuel in the fuel tank 111 is liquefied butane, the consumption rate of the liquefied butane is set to 110 g/hour, the flame T1 generated by the furnace 11 is introduced directly to heat the metal-supported solid oxide fuel cells 2 to a work temperature of about 750° C., and the electric performances (test results) of the testing models by consuming CO and $H_2$ fuels electrochemically are plotted in FIG. 5A.

In FIG. 5A, the curve A1 demonstrates the test result of power versus current upon the portable flame electric generation device 1 equipped with four 5×5 cm metal-supported solid oxide fuel cells 2 working at 750° C., the curve A2 demonstrates the test result of voltage versus current upon the portable flame electric generation device 1 equipped with four 5×5 cm metal-supported solid oxide fuel cells 2 working at 750° C., the curve B1 demonstrates the test result of power versus current upon the portable flame electric generation device 1 equipped with two 5×5 cm metal-supported solid oxide fuel cells 2 working at 750° C., and the curve B2 demonstrates the test result of voltage versus current upon the portable flame electric generation device 1 equipped with two 5×5 cm metal-supported solid oxide fuel cells 2 working at 750° C.

It has been proved, after at least 10 times of testing, that the aforesaid metal-supported solid oxide fuel cells 2 can generate electricity normally at the work temperature of 750° C. (heated directly by the flame from the room temperature). Definitely, the more the metal-supported solid oxide fuel cells 2 are applied, the better the electric performance is. Such a phenomenon can be also observed in FIG. 5B.

Figure 5B:
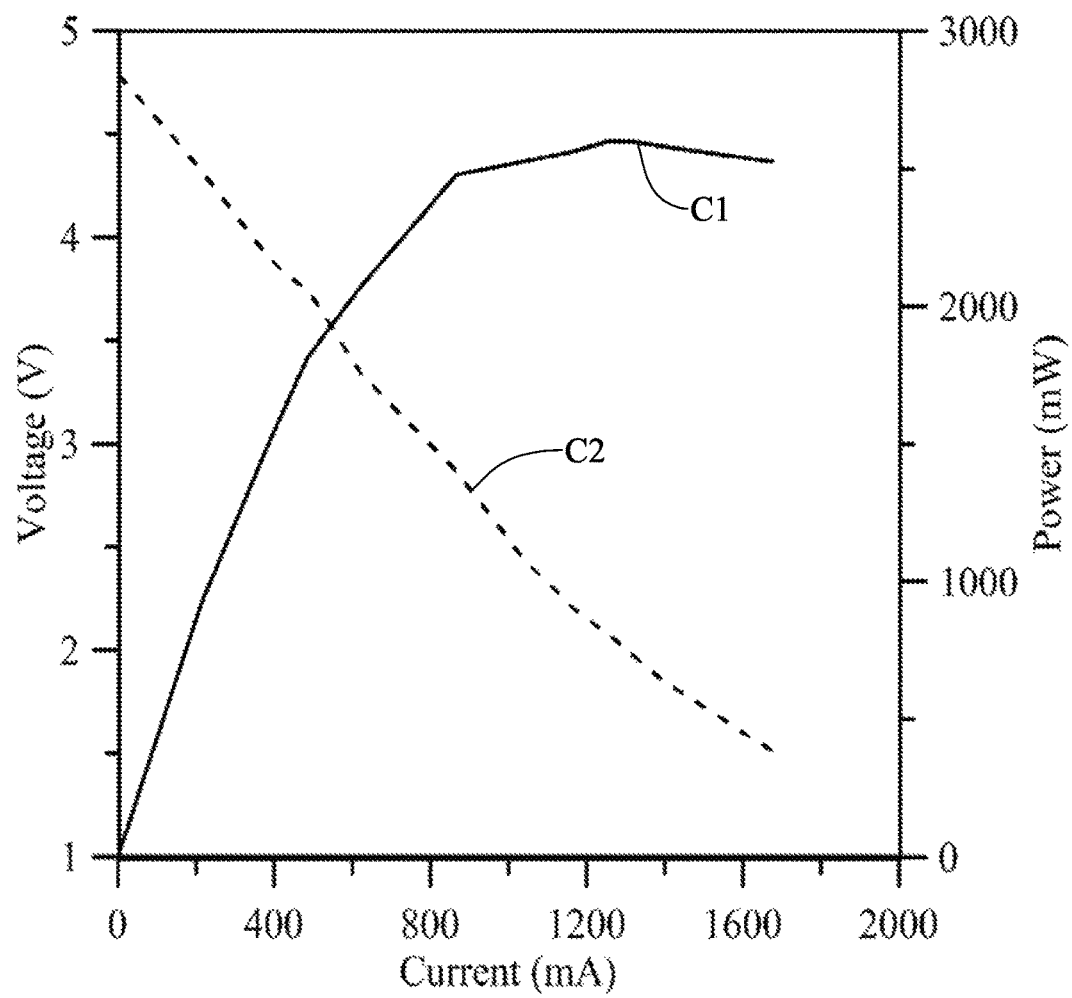
FIG. 5B shows the electric performance of a further embodiment (five 5×5 cm metal-supported solid oxide fuel cells) of the portable flame electric generation device in accordance with the present invention.

Referring now to FIG. 5B, a chart of electric performance of a further embodiment of the portable flame electric generation device in accordance with the present invention is shown.

The major difference between FIG. 5A and FIG. 5B is that, in the testing of FIG. 5B, the arrangement of the metal-supported solid oxide fuel cell 2 for testing is that shown in FIG. 2E (four metal-supported solid oxide fuel cells 2) with an additional metal-supported solid oxide fuel cell 2 on top thereof. Namely, in this testing, five metal-supported solid oxide fuel cells 2 are included, with four cells to form a square arrangement and another one is on the top of this square arrangement. Alternatively, these five metal-supported solid oxide fuel cells 2 can also be configured according to the arrangement of FIG. 2F. It shall be understood that different arrangements of the metal-supported solid oxide fuel cells 2, even with the number thereof, would lead to different test results.

In FIG. 5B, the curve C1 demonstrates the test result of power versus current upon the portable flame electric generation device 1 equipped with five 5×5 cm metal-supported solid oxide fuel cells 2 working at 750° C., and the curve C2 demonstrates the test result of voltage versus current upon the portable flame electric generation device 1 equipped with five 5×5 cm metal-supported solid oxide fuel cells 2 working at 750° C. By observing FIG. 5B, it is proved that the electric performance of the device 1 having five metal-supported solid oxide fuel cells 2 is better than that of the device 1 having four metal-supported solid oxide fuel cells 2.

Figure 6:
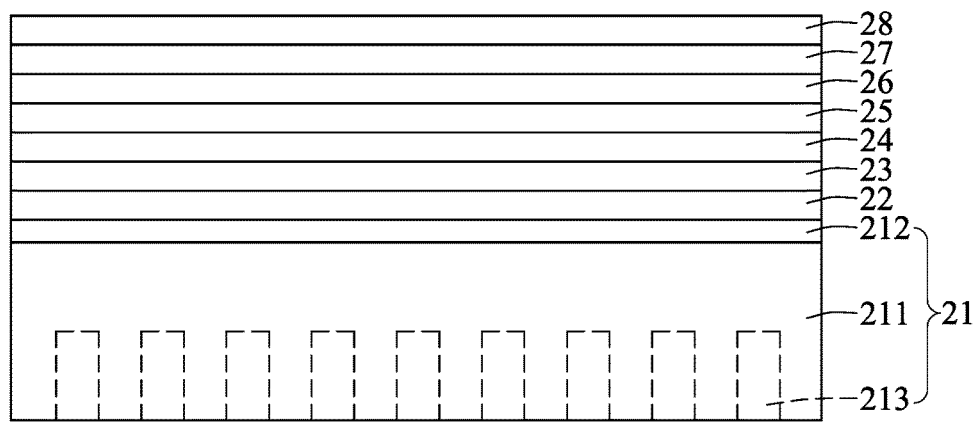
FIG. 6 is a schematic cross-sectional view of the preferred metal-supported solid oxide fuel cell in accordance with the present invention.

Referring now to FIG. 6, a schematic cross-sectional view of the preferred metal-supported solid oxide fuel cell in accordance with the present invention is shown.

In this embodiment, the metal-supported solid oxide fuel cell 2 includes a porous metal substrate 21, a first anode layer 22, a second anode layer 23, an anode isolation layer 24, an electrolyte layer 25, a cathode isolation layer 26, a cathode interface layer 27 and a cathode current-collecting layer 28.

The porous metal substrate 21 is a support of the metal-supported solid oxide fuel cell 2 and to diffuse the gas fuels ($H_2$ and CO) for reaction to the anode, and to discharge the reaction product (water for example) out of the anode.

In this embodiment, one major ingredient material for producing the porous metal substrate 21 is a Ni-based alloy or a Fe-base alloy that containing Cr (chromium). Practically, the material for producing porous metal substrate 21 can be an Ni—Fe alloy or a Ni—Mo s alloy, either of which the content of Fe or Mo shall be less than 15 wt %, or a ferristic stainless steel like Crofer 22. The porous metal substrate 21 can have a thickness within 1~2 mm, and a surface area within 2.5 cm×2.5 cm~10 cm×10 cm.

In one embodiment of the present invention, a metal frame (not shown in the figure) can be integrated to the porous metal substrate 21 as a single piece by a welding means, such that the stiffness of the porous metal substrate 21 and the entire structural strength of the metal-supported solid oxide fuel cell 2 can be substantially enhanced. In particular, the metal frame can be made of a stainless steel with superior anti-oxidation, anti-corrosion ability and a good thermal expansion coefficient matching the LSGM electrolyte of the metal-supported solid oxide fuel cell 2, such as the ferritic stainless steel Crofer 22, the stainless steel 440 or any the like. In addition, the metal frame can have a thickness within 1~3 mm and an thermal expansion coefficient within $10~14 \times 10^{-6}/°$ C.

In this embodiment of FIG. 6, the porous metal substrate 21 includes a porous plate body 211, a porous surface layer 212 and a plurality of straight gas channels 213.

As shown, the straight gas channels 213 for promoting the permeability of the porous metal substrate 21 are constructed inside the porous plate body 211. The number, shape, depth, arrangement and size of the straight gas channels 213 are determined per requirements.

As shown, the porous surface layer 212 located over the porous plate body 211 can have a thickness within 60~200 μm. Practically, the method for manufacturing the porous surface layer 212 can be a tape casting. Firstly, a green sheet formed of particles and organic materials including a binder and a plasticizer for producing the porous surface layer 212 is prepared. The green sheet is cut into a green thin plate with a relevant size (for example, 12~13 cm wide and 12~13 cm long). The green thin plate in placed on the porous plate body 211, and a low temperature lamination is performed thereon at a temperature of 70~100° C. and a pressure of 100~150 kg/cm² for 5~40 minutes. Then, under a reduced atmosphere or a vacuum at a high temperature of 900~1200° C., the porous surface layer 212 is formed from the green thin plate and laminated together with the porous plate body 211 by sintering. Thereby, the porous surface layer 212 can be firmly laminated over and connected to the porous plate body 211. In the present invention, the surface pore sizes of the porous surface layer 212 are less than 30 μm, so that the other functional layers can be successfully formed easily over the porous metal substrate 21 by plasma spraying methods. For example, the major ingredient material for producing the porous surface layer 212 can be a pure nickel, or a Ni-based alloy or a Fe-based alloy. In particular, the particle size of the metallic particles for producing the porous surface layer 212 can be within 10~40 μm, while that for producing the porous plate body 211 can be within 60~160 μm.

As shown in FIG. 6, the first anode layer 22, the second anode layer 23, the anode isolation layer 24, the electrolyte layer 25, the cathode isolation layer 26, the cathode interface layer 27, and the cathode current-collecting layer 28 are deposited in order, from bottom to top and layer by layer, onto the porous metal substrate 21.

Practically, the first anode layer 22 located over the porous surface layer 212 of the porous metal substrate 21 is a porous micron or submicron structure. The aforesaid micron porous structure implies that the particle sizes of the particles for producing the porous structure is within 0.5~10 μm. Similarly, the aforesaid submicron porous structure implies that the particle sizes of the particles for producing the porous structure is within 100~500 nm.

Materials for producing the first anode layer 22 are consisted of an electron conducting material and an oxygen ion conducting material, both have micron or submicron particle sizes. Namely, the first anode layer 22 is a micron or submicron structure. In addition, the first anode layer 22 can have a thickness within 10~30 μm, preferably within 15~25 μm, and a porosity within 25~40%.

As described above, the first anode layer 22 is a layer made of a mixture consisted of an electron conducting material and an oxygen ion conducting material. For example, the electron conducting material can be a nickel material, and the oxygen ion conducting material can be an yttria stabilized zirconia (YSZ) material. Also, the weight ratio of the electron conducting material to the oxygen ion conducting material can be 50:50, or 60:40, or 40:60.

The second anode layer 23 located over the first anode layer 22 is a porous nano structure. The foregoing porous nano structure implies that the particle sizes for producing this porous structure is less than 100 nm. The second anode layer 23 has a thickness within 10~30 μm, preferably within 15~25 μm, and a porosity within 15~30%.

The second anode layer 23 is made of a mixture consisted of an electron conducting material and an oxygen ion conducting material, both have nano particle sizes. This electron conducting material can be Ni, or Cu, or Ni—Cu (a mixture of Ni and Cu) or Ni—Cu—Co (a mixture of Ni, Cu and Co), and this oxygen ion conducting material can be $(ZrO_2)_{0.92}(Y_2O_3)_{0.08}$ (YSZ), or lanthanum doped ceria $La_{0.45}Ce_{0.55}O_{2-\delta}$ (LDC), or samarium doped ceria $Sm_{0.15}Ce_{0.85}O_{2-\delta}$ (SDC) or gadolinium doped ceria $Gd_{0.2}Ce_{0.8}O_{2-\delta}$ (GDC). Namely, materials for producing the second anode layer 23 can be YSZ—Ni (a mixture of Ni and YSZ), LDC-Ni (a mixture of Ni and LDC), GDC-Ni (a mixture of Ni and GDC), SDC-Ni (a mixture of Ni and SDC), or any nano composite mixture that has the like anode function. In the aforesaid mixtures used for the second anode layer 23, the weight percentage of the LDC or GDC or SDC can be varied from 40 wt % to 60 wt %.

The second anode layer 23 has a triple phase boundary (TPB) consisted of nano pores, nano particles of electron conducting materials, and nano particles of oxygen ion conducting materials. The nano particles of electron conducting materials form a 3D electron conducting network and can be nano particles of metals, for instance, Ni particles, or Cu particles, or Ni—Cu particles (a mixture of Ni and Cu particles), or Ni—Cu—Co particles (a mixture of Ni, Cu and Co particles), or any other electron conducting particles of metal or mixture of metals. The nano particles of oxygen ion conducting materials form another 3D oxygen ion conducting network and can be nano particles of metal oxides, for instance, YSZ, or LDC, or SDC, or GDC, or any other oxygen ion conducting metal oxide. The TPB in the second anode layer 23 can enhance anode electrochemical reaction activity and conductivity of the second anode layer 23, and so can also reduce the electric resistance and electric loss of the second anode layer 23. These 3D conducting networks are interlaced each other, the amount of metal particle aggregations (for instance, the Ni particle aggregations) in the 3D electron conducting network, under a high-temperature environment, can be effectively reduced by the existence of the closely interlaced 3D oxygen ion conducting network of metal oxide. Thereupon, the service life of the second anode layer 23 can be extended. Further, the weight percentages of the electron conducting materials and the oxygen ion conducting material in the second anode layer 23 can be 40 and 60, or 50 and 50, or 60 and 40.

The anode isolation layer 24 located over the second anode layer 23 is a dense structure or a porous nano structure. The porous nano structure is a structure produced from particles having particle sizes less than 100 nm. The anode isolation layer 24 is mainly made of a material that has electron and oxygen ion conducting capability and doesn't cause any adverse reaction with adjacent layers, this material can be the LDC, the YDC (yttria doped ceria, $Y_{0.2}Ce_{0.8}O_{2-\delta}$), the GDC or any the like. In particular, the anode isolation layer 24 has a thickness within 5~15 μm.

The electrolyte layer 25 located over the anode isolation layer 24 is a dense structure without any through-crack, this electrolyte layer 25 has a thickness within 25~55 μm. The electrolyte layer 25 is a composite layer consisted of two materials, such as strontium and magnesium doped lanthanum gallate (or lanthanum strontium gallium magnesium oxide, LSGM) and a sintering aid with an amount less than 1.5 wt %. The foregoing sintering aid is an oxide capable of promoting liquid phase sintering in the plasma sprayed coating, such as $Li_2O$, $V_2O_5$ or ZnO.

The cathode isolation layer 26 located over the electrolyte layer 25 is a dense structure or a porous nano structure. The foregoing porous nano structure implies that the sizes of the particles for producing this porous structure are less than 100 nm. The cathode isolation layer 26 is mainly made of an oxygen ion conducting material and doesn't cause adverse reactions with adjacent layers, such as the LDC, the YDC, the GDC or any the like. In particular, the cathode isolation layer 26 has a thickness within 5~15 μm.

In addition, any of the aforesaid isolation layers (the cathode isolation layer 26 or the anode isolation layer 24) is mainly to reduce or avoid adverse reactions between layers and adverse diffusions of improper elements among layers.

The cathode interface layer 27 is located over the cathode isolation layer 26. In addition, in another embodiment not shown in the figure, the cathode isolation layer 26 can be removed per requirements. Namely, in such an embodiment, the cathode interface layer 27 is located right over the electrolyte layer 25.

In this embodiment, the cathode interface layer 27 is a porous nano or submicron structure. The particle sizes of the cathode interface layer 27 can be nano-scaled or submicron-scaled, or the cathode interface layer 27 is formed of a mixture of nano-sized and submicron-scaled particles. The cathode interface layer 27 has a thickness within 15~40 μm, preferably within 20~30 μm, and a porosity within 15~30%.

The cathode interface layer 27 is made of a mixture of a mixed conducting material and an oxygen ion conducting material, the mixed conducting material can conduct both electrons and oxygen ions, such as LSCF ($La_{0.6}Sr_{0.4}Co_{0.2}Fe_{0.8}O_3$), SSC ($Sm_{0.5}$ $Sr_{0.5}CoO_{3-\delta}$) and double-perovskite-structured $PrBaCo_2O_{6-\delta}$ (PBC), and the oxygen ion conducting material can be LSGM, GDC, LDC and SDC. Hence, the cathode interface layer 27 is made of a mixture of LSCF and LSGM, a mixture of LSCF and GDC, a mixture of LSCF and LDC, a mixture of SSC and SDC, or a mixture of double-perovskite-structured $PrBaCo_2O_6$-δ (PBC) and SDC.

The particle sizes of the aforesaid oxygen ion conducting materials (LSGM, GDC, LDC and SDC) are submicron-scaled or nano-scaled, and the particle sizes of the aforesaid mixed conducting materials (LSCF, SSC and PBC) are also submicron-scaled or nano-scaled. The cathode interface layer 27 can have a TPB consisted of nano pores, nano particles of mixed conducting materials, and nano particles of oxygen ion conducting materials for providing better electrochemical reaction activity and conductivity. In the case that the cathode interface layer 27 is made of any aforesaid mixture of a mixed conducting material and an oxygen ion conducting material, the weight percentage of the oxygen-ion conducting material can be within 40 wt %~60 wt %.

The cathode current-collecting layer 28 located over the cathode interface layer 27 is a porous structure having a thickness within 20~50 μm, preferably within 30~40 μm, and a porosity within 30~50%. The particles forming the cathode current-collecting layer 28 are micron-scaled or submicron-scaled.

In the present invention, the cathode current-collecting layer 28 can be a single material of LSCF, or SSC, or PBC. The particle sizes of the LSCF, the SSC and the PBC are submicron-scaled or micron-scaled.

In the embodiment that the cathode current-collecting layer 28 is made of a mixture of two materials used for the cathode interface layer 27, the weight percentages of these materials for the cathode current-collecting layer 28 are 25% for LSGM and 75% for LSCF, or 25% for SDC and 75% for SSC, or 25% for SDC and 75% for PBC. The particle sizes of the LSGM and the SDC are submicron-scaled or micron-scaled.

In addition, in the embodiment having the metal frame, the surface of the metal frame can be coated by a protective layer (not shown in the figure). The protective layer is made of spinel or LSM so that the cathode interface layer 27 and the cathode current-collecting layer 28 are not poisoned by Cr. The material of metal frame can be the material used for SOFC interconnects.

As described above, the metal-supported solid oxide fuel cell 2 of the present invention can be integrated with one said metal frame as a unique piece by welding, preferably by laser welding. The porous metal substrate engaged with the metal frame can have an improved structural strength for the cell applications. Namely, the support structure for the metal-supported solid oxide fuel cell 2 of the present invention is the porous metal substrate 21, or the combination of the porous metal substrate 21 and the metal frame.

Further, since the anode layer (the second anode layer 23) and the cathode interface layer 27 of the metal-supported solid oxide fuel cell 2 can be nano structures formed by nano particles, thus electrochemical reaction activity and conductivity of the corresponding electrode would be enhanced, but the resistance of the electrode would be decreased so as to reduce the electricity loss. Also, since the anode layers (the first anode layer 22 and the second anode layer 23) and the cathode interface layer 27 are made of the mixture of aforesaid materials so as able to provide closely interlaced networks (the oxygen ion conducting network and the electron conducting network, or the oxygen ion conducting network and mixed conducting network), thus the interference effect of particle mobility between these two networks would be induced to reduce the aggregating of particles that form each individual network of the electrode structure under a high-temperature work environment, thereby the service life of the electrode structure can be significantly improved.

Figure 7:
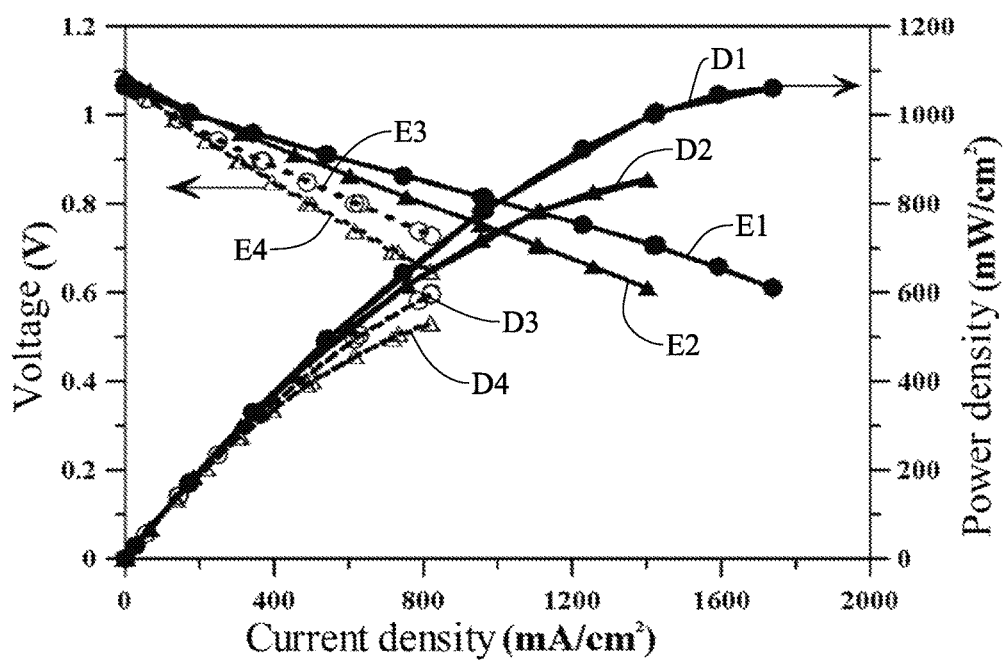
FIG. 7 demonstrates schematically the output performances of the metal-supported solid oxide fuel cells in accordance with the present invention.

Referring now to FIG. 7, the output performances of the metal-supported solid oxide fuel cells in accordance with the present invention is schematically demonstrated.

To verify electric performance of the metal-supported solid oxide fuel cell 2 of FIG. 6, a 5×5 cm sample model and another 10×10 cm sample model are used for testing. These two sample models adopt porous Ni—Mo substrates as the porous metal substrates. In each of the substrates, there are four straight gas channels 213 per square centimeter. The prepared cells include orderly: the porous metal substrate made of Ni—Mo, the first anode layer made of YSZ—NiO, the second anode layer made of GDC-NiO, the anode isolation layer made of LDC, the electrolyte layer made of LSGM with $Li_2O$ sintering aid (<1.5 wt %), the cathode isolation layer made of LDC, the cathode interface layer made of SDC(50%)-SSC(50%) and the cathode current-collecting layer made of SDC(25%)-SSC(75%). The aforesaid cathode interface layer made of SDC(50%)-SSC(50%) implies that the cathode interface layer is consisted of 50 wt % SDC and 50 wt % SSC. The aforesaid cathode current-collecting layer made of SDC(25%)-SSC(75%) implies that the cathode current-collecting layer is consisted of 25 wt % SDC and 75 wt % SSC. The NiO would be transformed into Ni when the $H_2$ gas passes through the anode of tested cell. For convenience, LSGM-$Li_2O$ stands for the LSGM with $Li_2O$ sintering aid (<1.5 wt %) in the following sections.

After the testing, the test results of voltages (V) with respect to current densities ($mA/cm^2$) and power densities ($mW/cm^2$) with respect to current densities at work temperatures of 700° C. and 750° C. upon the sample models of the metal-supported solid oxide fuel cell are plotted in FIG. 7.

In FIG. 7, the curve D1 demonstrates the test results (power densities versus current densities) at 750° C. upon the 5×5 cm metal-supported solid oxide fuel cell 2, the curve D2 demonstrates the test results (power densities versus current densities) at 700° C. upon the 5×5 cm metal-supported solid oxide fuel cell 2, the curve D3 the test results (power densities versus current densities) at 750° C. upon the 10×10 cm metal-supported solid oxide fuel cell 2, curve D4 demonstrates the test results (power densities versus current densities) at 700° C. upon the 10×10 cm metal-supported solid oxide fuel cell 2, the curve E1 demonstrates the test results (voltages versus current densities) at 750° C. upon the 5×5 cm metal-supported solid oxide fuel cell 2, the curve E2 demonstrates the test results (voltages versus current densities) at 700° C. upon the 5×5 cm metal-supported solid oxide fuel cell 2, the curve E3 demonstrates the test results (voltages versus current densities) at 750° C. upon the 10×10 cm metal-supported solid oxide fuel cell 2, and the curve E4 demonstrates the test results (voltages versus current densities) at 700° C. upon the 10×10 cm metal-supported solid oxide fuel cell 2.

While in testing the 10×10 cm metal-supported solid oxide fuel cell, the $H_2$ flow rate is 800 ml/min and the air flow rate is 2000 ml/min. While in testing the 5×5 cm metal-supported solid oxide fuel cell, the $H_2$ flow rate is 335 ml/min and the air flow rate is 670 ml/min.

By observing the results in FIG. 7, it is found that the OCV (i.e. the open circuit voltage) is 1.08V at zero current density. Since this voltage is greater than 1V, it implies that the electrolyte layer of the metal-supported solid oxide fuel cell 2 is dense enough to effectively separate the oxygen of air and the $H_2$ at opposing sides of the LSGM-$Li_2O$ electrolyte layer.

Figure 8:
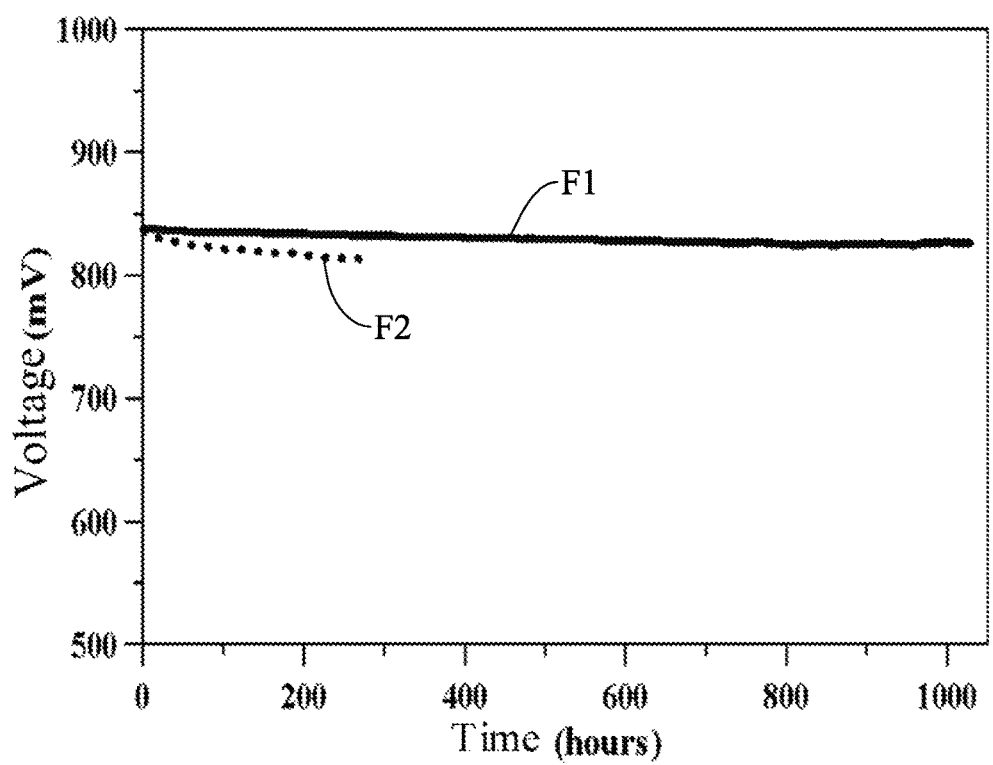
FIG. 8 is a plot of the output voltage with respect to the time for the metal-supported solid oxide fuel cell in accordance with the present invention.

Referring now to FIG. 8, a plot of the output voltage at 400 mA/cm$^2$ constant current density for the metal-supported solid oxide fuel cell in accordance with the present invention is schematically shown with respect to the time for 1000 hours.

As shown in FIG. 8, the curve therein demonstrates the variations of cell voltages with respect to time upon the 10×10 cm metal-supported solid oxide fuel cell. The curve F1 demonstrates a decay rate of 1.49%/1000 hr for the metal-supported solid oxide fuel cell having the LSGM electrolyte with the sintering aids ($Li_2O$ for example) added, and the curve F2 demonstrates a decay rate of 9.88%/1000 hr for the metal-supported solid oxide fuel cell having the LSGM electrolyte without adding a sintering aid ($Li_2O$ for example).

By comparing the curves F1 and F2, the metal-supported solid oxide fuel cell having the LSGM electrolyte with the sintering aids ($Li_2O$ for example) added can have a lower decay rate.

Figure 9:
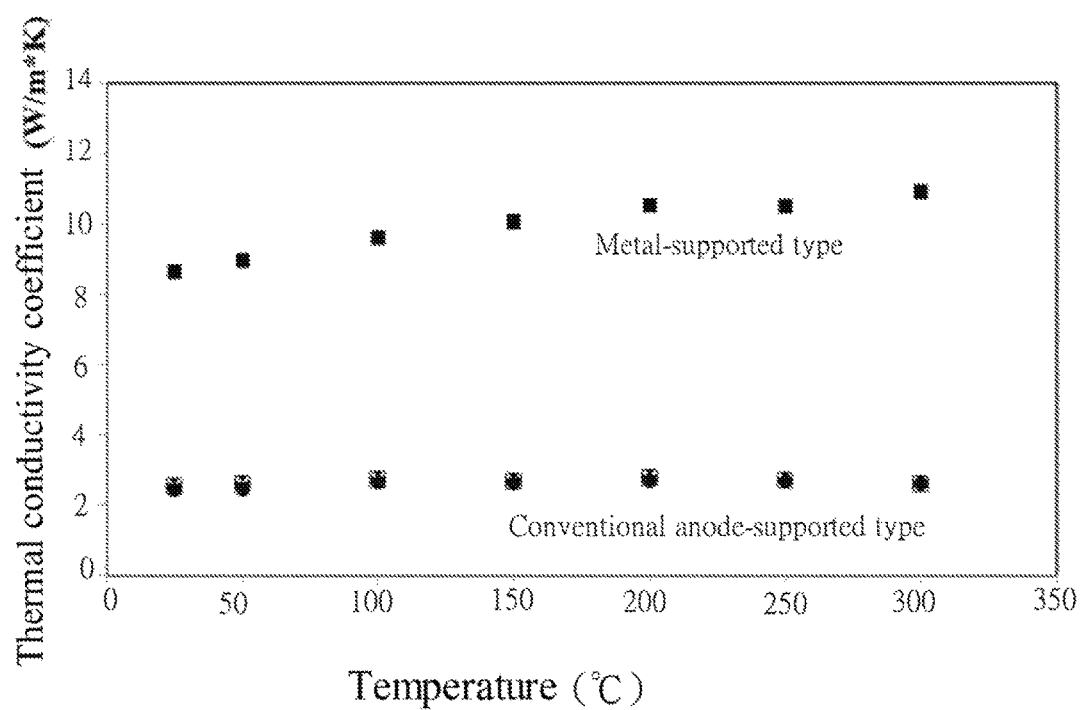
FIG. 9 demonstrates thermal conductivity coefficients with respect to the temperatures for the metal-supported solid oxide fuel cell in accordance with the present invention and the conventional anode-supported solid oxide fuel cell.

Referring now to FIG. 9, thermal conductivity coefficients with respect to the temperatures for the metal-supported solid oxide fuel cell in accordance with the present invention and the conventional anode-supported solid oxide fuel cell are schematically shown.

As shown in FIG. 9, the term "Metal-supported type" labeled in the figure stands for the metal-supported solid oxide fuel cell 2 of the present invention (as shown in FIG. 6), while the term "Conventional anode-supported type" therein stands for the conventional anode-supported solid oxide fuel cell in the prior art. By observing FIG. 9, it is found that the metal-supported solid oxide fuel cell in accordance with the present invention can provide better heat conductivity, and can withstand thermal shocks. Hence, the metal-supported solid oxide fuel cell of the present invention is much more applicable to an environment that a quickly heat-up is needed. Namely, the portable flame electric generation device 1 having the metal-supported solid oxide fuel cells 2 can be rapidly heated to start up and can also have the capability to withstand thermal shocks.

Details of the portable flame electric generation device 1 and metal-supported solid oxide fuel cell 2 have been elucidated above. In the following sections, the method for manufacturing the portable flame electric generation device 1 and the method for manufacturing the metal-supported solid oxide fuel cell 2 would be explained step by step.

Figure 10:
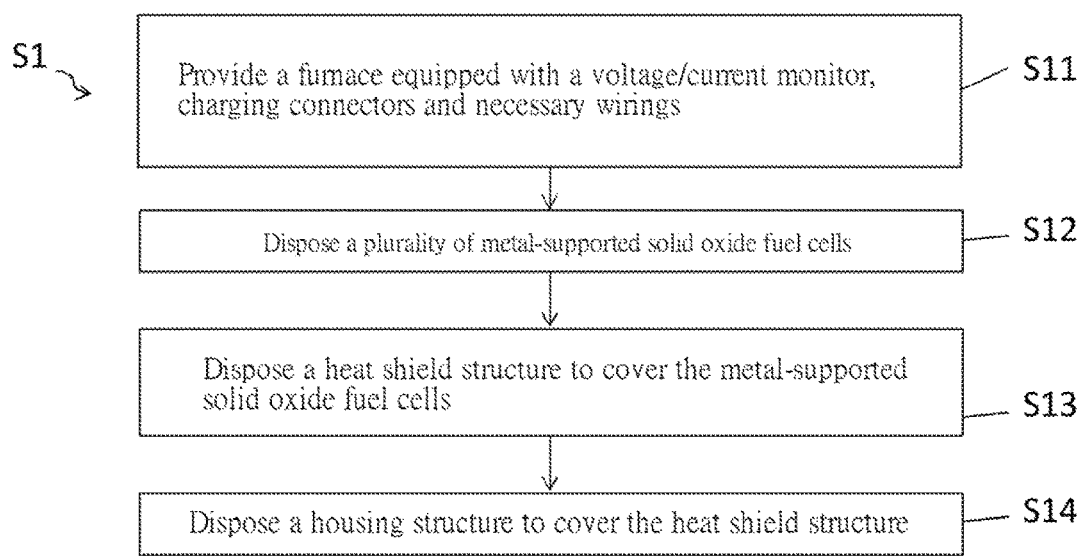
FIG. 10 is a flowchart of the preferred manufacturing method of the portable flame electric generation device in accordance with the present invention.

Referring now to FIG. 10, a flowchart of the preferred manufacturing method of the portable flame electric generation device in accordance with the present invention is shown.

In the present invention, the manufacturing method S1 of the portable flame electric generation device 1 includes the following steps.

Step S11: Provide a furnace 11 equipped with a voltage/current monitor, charging connectors and necessary wirings. The furnace 11 is to provide a flame T1, and is implemented with the monitor, charging connectors and connection wires.

Then, Step S12: Dispose a plurality of metal-supported solid oxide fuel cells 2 on the support structure 15 on the furnace 11 that provides the flame T1.

Further, the means for disposing the metal-supported solid oxide fuel cells 2 includes Step S121. In performing Step S121, a plurality of the metal-supported solid oxide fuel cells 2 is arranged to surround the flame T1 of the furnace 11. In the present invention, the metal-supported solid oxide fuel cells 2 can be arranged to be in series or in parallel. Step S121 can further includes Step S1211~Step S1213. Step S1211 is to dispose a metallic anode current collector 13 and a metallic cathode current collector 14 respectively to an anode side and a cathode side of the metal-supported solid oxide fuel cell 2. Then, Step S1212 is to dispose a mesh holder N1 to fix the metallic anode current collector 13 and the metallic cathode current collector 14, so that the metallic anode current collector 13 and the metallic cathode current collector 14 can connect to the corresponding anode and the corresponding cathode of the metal-supported solid oxide fuel cell 2. Finally, Step S1213 is to apply high temperature ceramic adhesive G1 or both the high temperature ceramic adhesive G1 and high temperature ceramic plates G2 to connect together the plurality of metal-supported solid oxide fuel cells 2 installed individually with conductive meshes. In the case that the space between the neighboring metal-supported solid oxide fuel cells 2 is small, then the high temperature ceramic adhesive G1 can directly applied to connect structurally these two neighboring metal-supported solid oxide fuel cells 2. On the other hand, in the case that the space between the neighboring metal-supported solid oxide fuel cell 2 is larger, then both the high temperature ceramic adhesive G1 and the high temperature ceramic plates G2 are applied for structural connections in between. The size of the high temperature ceramic plates G2 is dependent on the space between the two neighboring cells. In the present invention, the shape, the size and the thickness of the high temperature ceramic plates G2 are not limited.

Then, in Step S122, a top metal plate M1 or a metal-supported solid oxide fuel cell 2 is disposed right above the flame T1 generated by the furnace 11 by a distance to avoid the direct heating by the flame T1. Also, in Step S122, while in disposing the top metal plate M1, if the top metal plate M1 is large enough, a room or space M2 can be excavated appropriately from the top metal plate M1 to accommodate another metal-supported solid oxide fuel cell 2. In the same step (Step S122), the high temperature ceramic adhesive G1 can be also applied to seal the connection among the cells 2 or between the cells and the top metal plate. In the present invention, the top metal plate M1 can be a metal plate made of Crofer 22, ZMG232 or any ferritic stainless steel containing Cr.

The feasible connection relationships between the metal-supported solid oxide fuel cells 2 can be referred to those illustrated from FIG. 2A through FIG. 4B.

Figure 11:
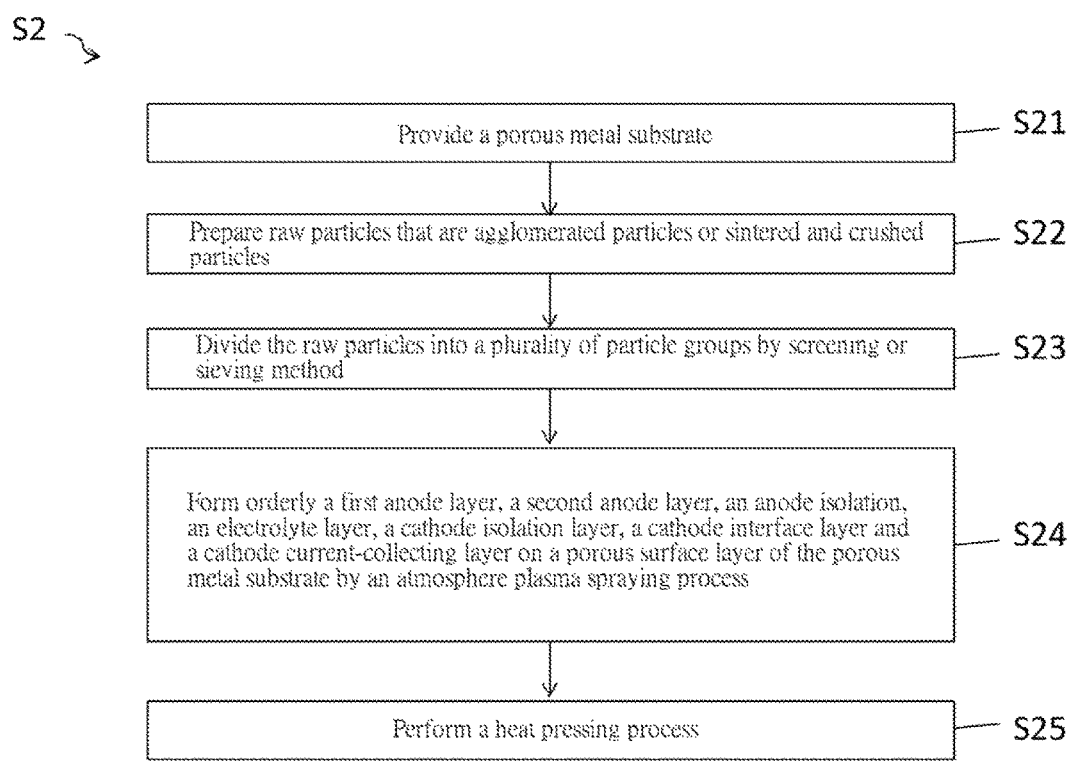
FIG. 11 is a flowchart of the preferred manufacturing method of the metal-supported solid oxide fuel cell in accordance with the present invention.

Referring now to FIG. 11, a flowchart of the preferred manufacturing method of the metal-supported solid oxide fuel cell 2 in accordance with the present invention is schematically shown.

In the present invention, the manufacturing method S2 of the metal-supported solid oxide fuel cell 2 includes the following steps.

Firstly, in Step S21, a porous metal substrate 21 is provided.

The structure of the porous metal substrate 21 can be referred to FIG. 6. In details, the method for producing the porous metal substrate would be elucidated as follows by accompanying figures, FIG. 12 and FIG. 13.

Figure 12:
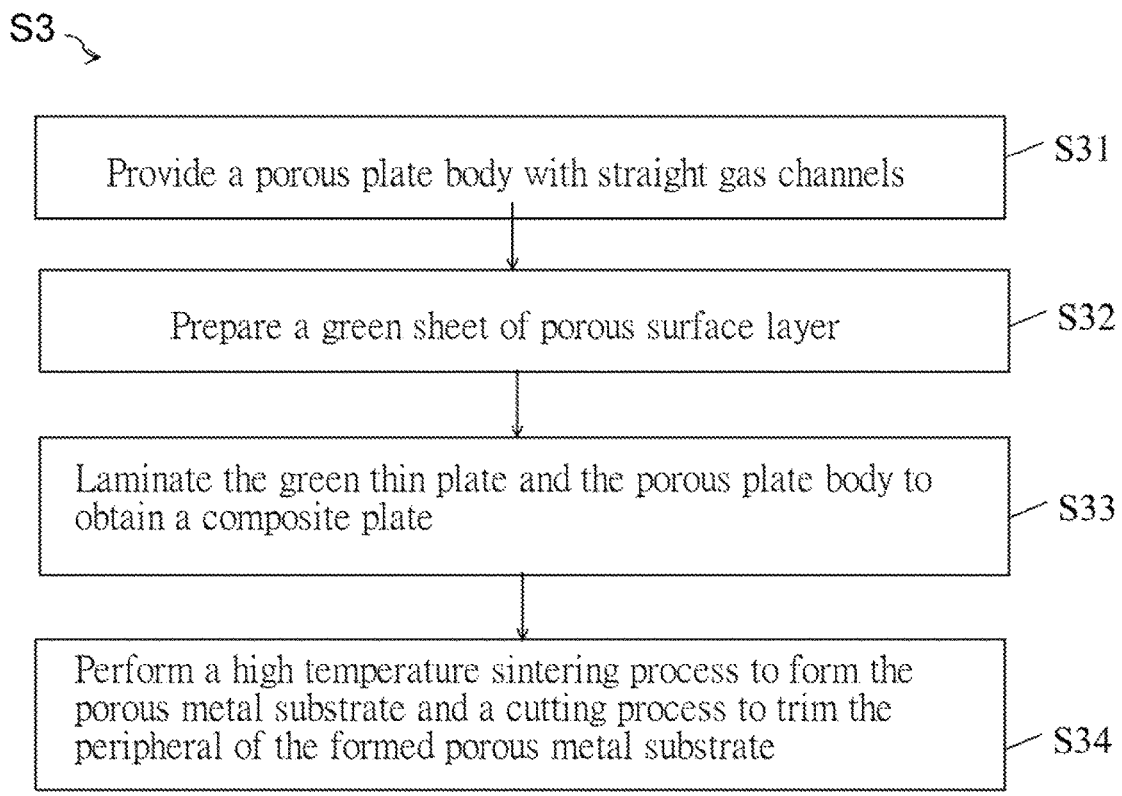
FIG. 12 is a flowchart of the preferred manufacturing method of the porous metal substrate in accordance with the present invention.

Referring now to FIG. 12, a flowchart of the preferred manufacturing method of the porous metal substrate in accordance with the present invention is schematically shown.

In the present invention, the manufacturing method S3 of the porous metal substrate includes the following steps.

Firstly, in Step S31, a porous plate body with straight gas channels is provided. The straight gas channels are evenly arranged into a square array pattern. For example, the porous plate body 211 has a length within 10.2~10.6 cm, a width within 10.2~10.6 cm, and a thickness within 1~1.2 mm, the straight gas channels have a diameter of 1.8 mm and a height of 0.5 mm, and the distribution of the straight gas channels can be 1.5 pieces/cm$^2$. The main materials for the porous plate body 211 are Ni and Mo. However, the present invention does not limit the materials of the plate body 211 to only Ni and Mo. In other embodiments of the present invention (not shown herein), materials for the plate body 211 can include pure Ni, Pure Co, Ni—Co, Ni—Fe—Co, Ni—Cr, Ni—Fe—Cr or any alloy the like. The existence of the straight gas channels 213 inside the porous plate body 211 can contribute significantly to $H_2$ penetration through the porous plate body 211. Further, the number, shape, height, size and arrangement of the straight gas channels can be various and mainly determined per requirements of the plate body 211.

Referring back to FIG. 12, after Step S31, Step S32 is performed to prepare a green sheet of the porous surface layer 212. In the present embodiment, the green sheet is cut properly into a green thin plate having a width within 12~13 cm and a length within 12~13 cm, for producing the porous surface layer 212.

Figure 13:
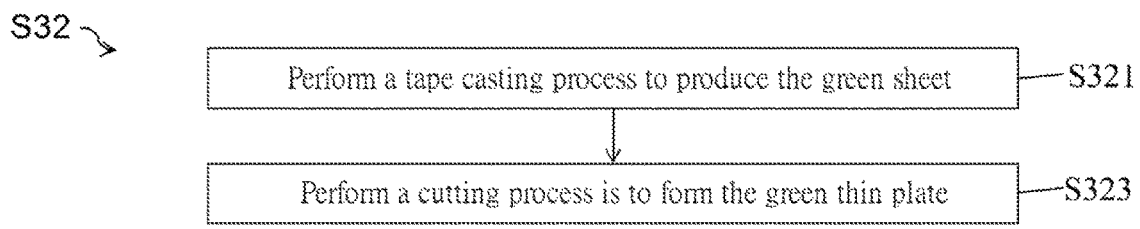
FIG. 13 is a flowchart for detailed steps of preparing the green sheet and the green thin plate of porous surface layer.

Referring now to FIG. 13, a flowchart for detailed steps of preparing the green sheet of FIG. 12 is schematically shown.

In Step S321, a tape casting process is performed to produce the green sheet.

In practice, firstly, prepare an empty 500 ml polypropylene (PP) container. In the container, 300 g 5 mm in diameter and 400 g 10 mm in diameter zirconia grinding balls are added.

Then, 50.7 g solvents are further added into the PP container. The foregoing solvent includes 34.53 g ethanol and 16.22 g toluene.

Then, 1.41 g fish oil dispersants are added into the PP container.

Then, the PP container is disposed into a 3D mixer for a mixing operation for 3~10 minutes.

Then, 281.12 g metallic particles are added into the PP container. The foregoing metallic particles can be pure Ni or a combination of 92 wt % Ni and 8 wt % Mo, in which the particle sizes of Ni are within 10~45 μm, and the particle sizes of Mo are less than 10 μm.

Then, 8.69 g binders (PVB-98 for example) are added into the container.

Then, 8.44 g plasticizers (S-261 for example) are added into the container.

Then, the PP container is disposed into the 3D mixer again for another mixing operation for at least 4~6 hours.

Further, apply a metal mesh to remove the zirconia grinding balls in the PP container.

Then, to degas the PP container by a vacuum means for 3~10 minutes.

Thereafter, the rest content in the PP container is moved to a tape casting machine for producing the green sheet. The tape casting machine is operated at a moving speed of 0.4 m/minute, and the product green sheet has a length within 2~3 m, a width within 12~13 cm and a thickness within 60~250 μm.

After Step S321, Step S323 of a cutting process is performed to cut the green sheet so as to form the green thin plate.

In particular, the green thin plate has both the length and the width to be within about 12~13 cm.

In Step S32, materials for the green sheet are pure Ni or Ni—Mo. However, in other embodiments of the present invention (not shown herein), materials for the green sheet can include Ni—Co, Ni—Fe—Co, Ni—Cr, Ni—Fe—Cr or any alloy the like. Further, the particle sizes for the metallic particles are within 10~45 μm.

Referring back to FIG. 12, after Step S32, Step S33 is performed to evenly laminate the green thin plate and the porous plate body so as to obtain a composite plate. The laminating process is performed at a temperature within 70~100° C., under a pressure within 100~150 kg/cm$^2$, and for a laminating time within 5~40 minutes.

In practice, the green thin plate obtained in Step S32 (having a length within 12~13 cm, a width within 12~13 cm and a thickness within 60~250 μm) is firstly disposed evenly and smoothly over the porous plate body 211 obtained in Step S31 (having a length within 10.2~10.3 cm, a width within 10.2~10.6 cm and a thickness within 1~1.2 mm), and then a laminating machine is applied to laminate the green thin plate onto the porous plate body 211 at a temperature within 70~100° C., under a pressure within 100~150 kg/cm$^2$, and for a laminating time within 5~40 minutes, to obtain the composite plate After Step S33, Step S34 is performed to carry out a high-temperature sintering process to form porous metal substrate 21 and then a cutting process is performed to trim the peripheral of the formed porous metal substrate 21.

In practice, the laminated composite plate is moved into a reducing atmosphere chamber filled with $H_2$ or into a vacuum chamber, and then the laminated composite plate is sintered at a temperature within 900~1200° C. for 2~4 hours, so as to form the porous metal substrate 21 with the porous surface layer 212. Namely, the porous plate body 211 and the porous surface layer 212 are integrated to produce the porous metal substrate 21.

In addition, except having the porous surface layer with surface pore sizes less than 30 μm, the porous surface layer 212 can also evenly distribute the $H_2$ fuel out of the porous metal substrate 21 to the anode layers (including the first anode layer 22 and the second anode layer 23), such that the generated current density can be homogenized, and hot spots caused by unexpectedly higher or excessive current densities with respect to the homogeneous or average current density can be minimized.

In the present invention, materials for the porous surface layer 212 can be the same as or different to those for the porous plate body 211. However, the thermal expansion coefficients of the materials used for the porous surface layer 212 and for the porous plate body 211 shall be close.

In the foregoing descriptions, the 10×10 cm porous metal substrate 21 is taken as a typical example. However, the flowchart of FIG. 12 and the accompanying explanations can also be applied for the porous metal substrates with different sizes (2.5×2.5 cm~20×20 cm for example).

Referring back to FIG. 11, after the porous metal substrate 21 is produced in Step S21, the coating processes of atmospheric plasma spraying for forming all functional layers 22 to 28 of the metal-supported solid oxide fuel cell 2 can then be performed.

Then, Step S22 is performed to prepare raw particles of all functional layers.

In Step S22, all the raw particles for producing individual functional layers of the metal-supported solid oxide fuel cell 2 would be prepared. These functional layers include the first anode layer 22, the second anode layer 23, the anode isolation layer 24, the electrolyte layer 25, the cathode isolation layer 26, the cathode interface layer 27 and the cathode current-collecting layer 28.

In practice, particles with considerable flowability are preferred, such as agglomerated particles produced by spray drying method or particles produced by sintering and crushing. However, since the following coating steps involves a plasma spraying process, thus, except the aforesaid flowability, the determination of particles relevant to this embodiment shall consider the uniform thermal heating of the particles in the plasma spraying process. Accordingly, particle sizes of the particles sent into the plasma flame shall not lower and exceed predetermined range limits. Generally, proper meshes are applied to screen or sieve the particles so as to obtain specific sizes of particles within or meeting the foregoing range limits of the particle sizes.

Among these functional layers, the preparation of the agglomerated particles produced by spray drying method for the LSGM-$Li_2O$ electrolyte layer 25 is demonstrated as a typical example. In this typical example, 1 wt % $Li_2O$ sintering aid is added into LSGM particles, in which 1 wt % stands for the weight percentage of the $Li_2O$ particles, i.e. (weight of $Li_2O$ particles)/(weight of $Li_2O$ particles+weight of LSGM particles)×100%=1%.

Firstly, add 99 g LSGM particles into a 500 ml PVC bottle, in which the particle sizes of LSGM are submicron-scaled.

Then, add 1 g $Li_2O$ particles into the 500 ml PVC bottle.

Then, add 200 g deionized water into the 500 ml PVC bottle.

Then, add 300 g $Al_2O_3$ grinding balls with 5 mm diameters into the 500 ml PVC bottle.

Then, add 15 g PVA solutions into the 500 ml PVC bottle, in which the PVA solution is a deionized water solution with 5~15 wt % PVA.

Then, lock the cap of 500 ml PVC bottle, and seal the bottle by winding a tape onto the thread of bottle with several rounds so as to ensure the sealing of the bottle.

Then, the PVC bottle is disposed into a rotary ball grinder, and a first-stage ball-grinding process is performed with the rotary ball grinder at a rotational speed of 150 rpm for about 45 minutes.

After the first-stage ball-grinding process, the 500 ml PVC bottle is opened.

Then, add 3.33 g polyethylene glycol (PEG) solutions into the aforesaid 500 ml PVC bottle.

Then, lock the cap of 500 ml PVC bottle, and seal the bottle by winding a tape onto the thread of bottle several rounds so as to ensure the sealing of the bottle again.

Then, the PVC bottle is disposed into a rotary ball grinder, and a second-stage ball-grinding process is performed with the rotary ball grinder at a rotational speed of 150 rpm for about 45 minutes.

After the second-stage ball-grinding process, the 500 ml PVC bottle is re-opened, and then the mixed slurry is obtained.

Then, a stainless steel filter is applied to separate the $Al_2O_3$ grinding balls from the mixed slurry, and the filtered mixed slurry is disposed in a 500 ml beaker.

Then, the 500 ml beaker containing the mixed slurry is disposed into a vacuum chamber so that a degassing process by vacuum can be performed therein.

Thereafter, after the vacuum degassing process upon the mixed slurry is finished, then a spray drying process can be performed upon the mixed slurry.

It shall be understood that, in the foresaid embodiment, the $Li_2O$ is implemented as a typical sintering aid. However, according to the present invention, the candidate sintering aid is not limited to the $Li_2O$. Actually, any metal oxide with a low melting point (such as $V_2O_5$ or ZnO) can be a qualified sintering aid if it provides the liquid-phase sintering effect on LSGM electrolyte without decreasing the oxygen-ion conductivity and increasing the electron conductivity of the LSGM electrolyte obviously.

In addition, in this embodiment, the weight percentage of the sintering aids shall be less than 1.5 wt %.

In the foregoing description, the preparation of the LSGM-$Li_2O$ agglomerated particles by the spray drying method for forming the LSGM-$Li_2O$ electrolyte layer is taken as a typical example, but not the only embodiment for the present invention. In another embodiment, the aforesaid preparation method can also be used in preparing raw YSZ—NiO agglomerated particles. Then, the raw YSZ—NiO agglomerated particles can be used to produce the YSZ—NiO layer. The YSZ and NiO particles before executing spay drying method to form the corresponding YSZ—NiO agglomerated particles are named as the original particles, and their sizes can be micron-scaled (less than 5 micron) or submicron-scaled (100~500 nm) or nano-scaled (less than 100 nm). In a further embodiment, the aforesaid preparation method can also be used in preparing raw SDC-SSC agglomerated particles. Then, the raw SDC-SSC agglomerated particles can be used to produce the SDC-SSC layer. The original particle sizes of SDC and SSC before executing spay drying method can be nano-scaled (less than 100 nm) in SDC and submicron-scaled (100~500 nm) in SSC.

In Step S22, in the case that sintered and crushed particles with considerable flowability are available in the market, they can also be applied easily to form for all functional layers of the metal-supported solid oxide fuel cell 2. After the Step S22, the raw particles (either agglomerated or sintered and crushed particles) for all functional layers are ready. Then, Step S23 is performed to divide, by screening or sieving method, the aforesaid raw particles (either agglomerated or sintered and crushed particles) are divided into a plurality of particle groups.

It shall be explained in advance that the necessity of performing the aforesaid screening or sieving process to divide the raw particles for a specific functional layer into particle groups (Step S23) depends on the practical need of each functional layer. But it is needed for producing a dense and airtight electrolyte layer without through cracks so that the OCV can be larger than 1V.

In this embodiment, the electrolyte layer 25 is taken as a typical example to demonstrate the screening or sieving process for dividing the agglomerated particles produced by the spray drying method into particle groups. As stated above, the screening or sieving process is to divide the raw particles, by screening or sieving with meshes, into a plurality of particle groups with different grain particle sizes. For example, the raw LSGM-$Li_2O$ agglomerated particles formed by the spray drying method can be divided into three particle groups, a first particle group having particle sizes within 10~20 μm, a second particle group having particle sizes within 20~45 μm, and a third particle group having particle sizes within 45~70 µm. Thereupon, thermal heating uniformity of the particles subjected to the plasma spray flame can be improved so that a dense and airtight electrolyte layer without through cracks can be formed and the possible leakages of $O_2$ and $H_2$ across the electrolyte layer 25, as shown in FIG. 6, can be effectively avoided. In the art, these leakages can cause the final product, the metal-supported solid oxide fuel cell, to lose its electric performance.

After Step S23, all the raw particles have been screened and divided into a plurality of particle groups. Then, Step S24 is performed to form orderly a first anode layer 22, a second anode layer 23, an anode isolation layer 24, an electrolyte layer 25, a cathode isolation layer 26, a cathode interface layer 27 and a cathode current-collecting layer 28 on the porous surface layer 212 of the porous metal substrate 21 by the atmosphere plasma spraying process.

In practice, the LSGM-$Li_2O$ electrolyte layer is taken as a typical example to demonstrate the execution of Step S24. Before Step S24, the raw agglomerated LSGM-$Li_2O$ particles (the weight percentage of $Li_2O$ is less than 1.5 wt %) formed by the spray drying method are divided into several particle groups by screening or sieving them with meshes; for example, a first particle group having particle sizes within 10~20 µm, a second particle group having particle sizes within 20~45 µm, and a third particle group having particle sizes within 45~70 µm. The purpose of the screening process for dividing the particles into particle groups that have narrow ranges of particle sizes is to determine a fixed proper plasma spray power for a particle group that is selected to perform the following plasma spraying process. A fixed plasma spray power can only melt specific agglomerated particles within a specific range of agglomerated particle sizes. In the plasma spraying process, the raw particles (either agglomerated or sintered and crushed particles) are sent to the high temperature plasma flame by powder feeders, too large or too small particles can be overshot or undershot with respect to the plasma flame so that they can not enter into the highest temperature zone of the plasma flame produced by a fixed plasma spray power and the incomplete melting of these agglomerated particles occurs. Therefore, if the first particle group of LSGM-$Li_2O$ is selected for performing the plasma spraying process, then the appropriate plasma spray power would be 46~49 kW; if the second particle group of LSGM-$Li_2O$ is selected for performing the plasma spraying process, then the appropriate plasma spray power would be 49~52 kW; and, if the third particle group of LSGM-$Li_2O$ is selected for performing the plasma spraying process, then the appropriate plasma spray power would be 52~55 kW.

Since the particles larger than 10 micron can provide better flowability for powder feeders, thus, according to the present invention, before the plasma spraying process is applied to produce the functional layer, the original particles having particle sizes less than 100 nm can be transformed into agglomerated particles larger than 10 micron by the spray drying method, and also the original particles having submicron (100~500 nm) and micron (less than 5 micron) particle sizes can be transformed into agglomerated particles larger than 10 micron by the same spray drying method. Namely, no matter whether the original particles are nano-sized, submicron-sized, or micron-sized, the spray drying method can always be applied to produce corresponding micron-scaled agglomerated particles that provide better flowability for facilitating the operation of plasma spraying process to produce all functional layers of a cell.

In addition, it shall be explained that the aforesaid three particle groups are simply raised for elucidating the foregoing embodiment of the present invention. In other embodiments of the present invention, the particle groups may not be limited to the aforesaid three particle groups.

The aforesaid plasma spraying process (also called as the plasma spray coating process) for producing the electrolyte and isolation layers that are dense without through cracks is generally applied to a specific particle group that has a narrow range of particle sizes. But for producing porous functional layers such as anode and cathode layers, a particle group that has a wide range of particle sizes is applied. Based on the selected particle group, an appropriate plasma spray power can then be determined experimentally. Following are some examples to explain the plasma spray coating process.

In one embodiment, the method for manufacturing a crack-free airtight LSGM-$Li_2O$ electrolyte layer is described as follows.

The agglomerated particles of the 20~45 µm particle group are selected to be injected into the plasma flame by a powder feeder, in which this agglomerated particles are LSGM-$Li_2O$ mixed particles produced from original submicron LSGM particles and $Li_2O$ particles (less than 1.5 wt %) by spray drying method and Step S23. The injection of these particles is an external injection toward the plasma flame. The plasma gases for the plasma spraying process include the argon gas at 49~56 slpm (liter/minute), the helium gas at 23~28 slpm and the nitrogen gas at 2~5 slpm, each of gases has a work pressure at 4~6 kg/$cm^2$, other parameters are: a plasma spray power at 49~52 kW, a current at 415~433 A, a voltage at 118~120V, a spray distance at 8~11 cm, a spray gun at a scanning speed of 1000~1800 mm/sec, a powder-feeding rate at 1~6 g/min, and a preheat temperature (to preheat the object to be coated) at 700~850° C.

In one embodiment, the method for manufacturing a porous YSZ—NiO first anode layer is described as follows.

The agglomerated particles of the 20~63 µm particle group are selected to be injected into the plasma flame, in which the foregoing particles are YSZ—NiO mixed particles produced from the original YSZ and NiO particles that have d50 about 1 µm by spray drying method. The injection of the particles is an external injection toward the plasma flame. The plasma gases for the plasma spraying process include the argon gas at 49~56 slpm (liter/minute), the helium gas at 23~28 slpm and the nitrogen gas at 2~5 slpm, each of gases has a work pressure at 4~6 kg/$cm^2$, other parameters are: a plasma spray power at 40~46 kw, a current at 333~373 A, a voltage at 120~123V, a spray distance at 9~12 cm, a spray gun at a scanning speed of 1000~1800 mm/sec, a powder-feeding rate at 1~6 g/min, and a preheat temperature (to preheat the object to be coated) at 600~750° C. The NiO of the aforesaid first anode layer would be transformed into Ni after the cell having this first anode layer undergoes a hydrogen reduction test.

In one embodiment, the method for manufacturing a porous SDC(50 wt %)—SSC(50 wt %) cathode interface layer is described as follows.

The agglomerated particles of the 20~63 µm particle group are selected to be injected into the plasma flame, in which the foregoing particles are SDC-SSC mixed particles produced by spray drying method from the original SDC particles with particle sizes less than 100 nm and original SSC particles with 100 nm~500 nm particle sizes. The injection of the particles is an external injection toward the plasma flame. The plasma gases for the plasma spraying process include the argon gas at 49~56 slpm (liter/minute), the helium gas at 23~28 slpm and the nitrogen gas at 2~5 slpm, each of gases has a work pressure at 4~6 kg/cm², other parameters are: a plasma spray power at 29~36 kw, a current at 245~298 A, a voltage at 118~121V, a spray distance at 9~12 cm, a spray gun at a scanning speed of 600~1000 mm/sec, a powder-feeding rate at 1~6 g/min, and a preheat temperature (to preheat the object to be coated) at 600~750° C.

In one embodiment, the method for manufacturing a porous SDC(25 wt %)—SSC(75 wt %) cathode current-collecting layer is described as follows.

The agglomerated particles of the 20~63 μm particle group are selected to be injected into the plasma flame, in which the foregoing particles are SDC-SSC mixed particles produced by spray drying method from the original SDC particles with particle sizes less than 100 nm and original SSC particles with 100 nm~500 nm particle sizes. The injection of the particles is an external injection toward the plasma flame. The plasma gases for the plasma spraying process include the argon gas at 49~56 slpm (liter/minute), the helium gas at 23~28 slpm and the nitrogen gas at 2~5 slpm, each of gases has a work pressure at 4~6 kg/cm², other parameters are: a plasma spray power at 27~31 kw, a current at 230~261 A, a voltage at 117~119V, a spray distance at 9~12 cm, a spray gun at a scanning speed of 600~1000 mm/sec, a powder-feeding rate at 1~6 g/min, and a preheat temperature (to preheat the object to be coated) at 600~750° C.

In the aforesaid methods for producing the functional layers of the metal-supported solid oxide fuel cell 2, because the agglomerated particles produced by spray drying method are screened or sieved to divide particles into particle groups having different ranges of particle sizes and the three-gas (argon, helium and nitrogen) atmosphere plasma spraying process is applied to fabricate the metal-supported solid oxide fuel cell, the quality and strength of cell functional layers are significantly enhanced.

In the present invention, the electric performance of the cell can also be enhanced by applying an impregnation process to put nano catalysts (nano Ag, nano Pd or the like) into the porous cathode current-collecting layer 28 or cathode interface layer 27 of the cell.

Then, Step S25 is performed to carry out a heat pressing process.

In one embodiment, the parameters of the heat pressing process include a temperature at 825~850° C., a pressure at 300~1000 g/cm², and a heat pressing time for 2~4 hours. After the heat pressing process, the smoothness, the interlayer binding, and the entire electric performance of the metal-supported solid oxide fuel cell 2 can be substantially improved.

In addition, the porous metal substrate 21 and a metal frame can be further welded together.

Refer now back to FIG. 10 for the manufacturing method S1 of the portable flame electric generation device 1.

After Step S12, Step S13 is performed to dispose a heat shield structure 12 to cover the metal-supported solid oxide fuel cells 2, in which the heat shield structure 12 includes a plurality of first ventilation channels 121. The anode side of each metal-supported solid oxide fuel cell 2 faces the flame T1, while the cathode side thereof faces the corresponding first ventilation channels 121 of the heat shield structure 12.

In Step S13, Step S131 is further included to dispose a support structure 15 between the heat shield structure 12 and the furnace 11 to support.

Then, in Step S14, a housing structure 19 is disposed to cover the heat shield structure 12, in which the housing structure 19 further includes a plurality of second ventilation channels 191.

In Step S14, in the case that the housing structure 19 is a metal cover, an additional step is included to dispose a thermal insulation structure onto the inner walls of the housing structure 19.

In Step S14, a step is further included to dispose a pad structure 192 between the housing structure 19 and the heat shield structure 12, so as to form a thermal insulation gap GA1 between the housing structure 19 and the heat shield structure 12.

In the present invention, the metal-supported solid oxide fuel cell is used as an electric generation element, and the number of the aforesaid fuel cells in the portable flame electric generation device can be one, two or plural. If the number of the fuel cells is more than two, then these metal-supported solid oxide fuel cells can be connected in series or in parallel, per requirements. Also, each of the fuel cells is spaced from the flame by a predetermined distance so as to prevent the flame to burn the metal-supported solid oxide fuel cell directly. Thus, heat distribution across the fuel cell can be improved and more uniform, and possible localized overheating at specific location on the fuel cell can be avoided.

Further, the portable flame electric generation device equipped with the metal-supported solid oxide fuel cells can provide an innovative power supply choice. Also, the metal-supported solid oxide fuel cell of the present invention can be quickly started up and withstand thermal shocks. After the metal-supported solid oxide fuel cell incorporates the flame of the portable flame electric generation device, the fuels of CO and $H_2$ contributed from the incomplete combustion of a liquefied fuel such as liquefied butane or propane can be directly transformed into electric energy via electrochemical reactions. Hence, the shortcoming in cell cracking due to the quick heating by flame for the conventional anode-supported (cermet-supported) solid oxide fuel cell can thus be avoided.

In addition, the portable flame electric generation device can use a small-sized portable liquefied gas cartridge as the fuel and heat source and/or a convenient container of liquefied gas as the fuel and heat source. By providing the metal-supported solid oxide fuel cells, the chemical energy of the CO and $H_2$ fuels can be transformed into electric power via the electrochemical reactions. Then, a voltage converter can be applied to transform the electric power of cells into the voltage suitable for various 3C products. Obviously, the portable flame electric generation device of the present invention can be conveniently applied outdoors (in a camping field for example), and can be adopted as a charging station for illumination or communication devices.

Further, the heat shield structure of the present invention has a thermal heat resistance to reduce the heat loss from the region encircled by the metal-supported solid oxide fuel cells. Also, by having the heat shield structure, the temperature distribution of the metal-supported solid oxide fuel cell can be well kept to a relatively uniform state. Thereupon, the temperature of the metal-supported solid oxide fuel cell can be controlled more easily, and the work temperature of the metal-supported solid oxide fuel cell can be quickly elevated to achieve a better performance.

Furthermore, the housing structure of the present invention is located exteriorly to the heat shield structure, such that the disadvantage effect of the power fluctuations caused by different wind conditions can be reduced to a minimum.

By having the housing structure, operators or any personnel can be protected from direct touching the heat shield structure. In particular, if the housing structure is made of a metallic material, then by having the thermal insulation structure adhered to inner walls of the housing structure, operators or any personnel can touch the housing structure in a short time.

Further, since a thermal insulation gap is kept between the housing structure and the heat shield structure, thus the heat absorbed by the housing structure can be reduced. Also, the air required by the cathode of the metal-supported solid oxide fuel cell can be furnished through a path established by the second ventilation channels, the thermal insulation gap and the first ventilation channels.

Furthermore, the metal-supported solid oxide fuel cell of the present invention can provide preferable properties. By introducing the metal supports with high thermal conductivity and the plural straight gas channels, the CO and $H_2$ fuels can be easily transported to the anode functional layers (the first anode layer and the second anode layer) for undergoing electrochemical reactions to generate electricity. Also, the reaction products of water and $CO_2$ can be delivered out of the anode easily so as to enhance the output power of the solid oxide fuel cell and the utilization of fuel.

In addition, since the second anode layer of the metal-supported solid oxide fuel cell is a nano porous structure that has a larger TPB (triple phase boundaries) for anode reactions to generate electricity, such that the total generation capacity can be raised.

Also, in the metal-supported solid oxide fuel cell of the present invention, in order to have high oxygen ion conductivity, the LSGM electrolyte material is used. In producing the LSGM electrolyte layer, a small amount of sintering aids is added into the LSGM electrolyte, by the liquid phase sintering effects the formation of tiny voids in the LSGM electrolyte layer is significantly reduced while in melting the LSGM electrolyte particles by the plasma flame to form the LSGM electrolyte layer. Thereupon, the airtightness of the LSGM electrolyte layer can be greatly improved.

Further, since the second anode layer and the cathode interface layer of the metal-supported solid oxide fuel cell 2 can be nano structures formed by nano particles, thus electrochemical reaction activity and conductivity of the corresponding layer would be enhanced, and the resistance of the corresponding layer would be lowered so as to reduce the electricity loss. Also, since the first anode layer, the second anode layer and the cathode interface layer are made of the two-material mixture so as able to provide closely interlaced networks (the ion conducting network and the electron conducting network), thus the interference effect of particle mobility between these two networks would be induced to reduce the aggregating of particles that form each individual network of the electrode structure under a high-temperature work environment, and thereby the service life of the electrode structure can be significantly improved.

In one embodiment of the present invention, the metal-supported solid oxide fuel cells can be disposed in a metal frame. After the porous metal substrate of the cell is integrated with the metal frame, a better support strength can be provided to the cell, and thus the metal frame can also provide better feasibility to pack plural cells into a larger cell assembly for providing a larger electric power. Also, the thermal conductivity of the cell or the cell assembly can be promoted by the usage of the metal frame. In the present invention, the supporting structure of the metal-supported solid oxide fuel cell can be the porous metal substrate of the cell, or the combination of the porous metal substrate and the metal frame.

In addition, the manufacturing method of the metal-supported solid oxide fuel cell in accordance with the present invention is not a conventional sintering process, but an atmosphere plasma spraying process to produce the metal-supported solid oxide fuel cell, such that a better inter-layer binding strength can be obtained so as to minimize possible layer-strippings in the quick startup and thermal-shock applications. Hence, the portable flame electric generation device equipped with the metal-supported solid oxide fuel cell of the present invention can quickly start up and has a longer service life.

Further, in the present invention, the original particles having particle sizes less than 100 nm can be transformed into larger micron-scaled agglomerated particles by the spray drying method, and also the original particles having submicron (100~500 nm) and micron (<5 μm) particle sizes would be transformed into larger agglomerated particles by the same spray drying method. Furthermore, the agglomerated particles or sintered and crushed particles can be divided into particle groups by a screening or sieving process based on the particle sizes. Then, the proper particle group and proper spray power can be selected to form the corresponding functional layers by spray coating. Thereupon, the incomplete melting and overheating of the particles in the spray coating process can be minimized.

In addition, by applying the screening or sieving process to divide the particles into different particle groups and the three-gas (argon, helium and nitrogen) atmosphere plasma spraying process for forming the functional layer, the quality and strength of cell functional layers can be significantly enhanced.

Also, in the present invention, electric performance of the cell can also be enhanced by applying an impregnation process to put nano catalysts (nano Ag, nano Pd or the like) into the porous cathode current-collecting layer or cathode interface layer of the cell.

While the present invention has been particularly shown and described with reference to a preferred embodiment, it will be understood by those skilled in the art that various changes in form and detail may be without departing from the spirit and scope of the present invention.

What is claimed is:

1. A portable flame electric generation device, comprising:
    a furnace for providing a flame;
    a heat shield structure, located above the furnace and including a plurality of first ventilation channels;
    a plurality of metal-supported solid oxide fuel cells, mounted above the furnace, covered by the heat shield structure, an anode side of each said metal-supported solid oxide fuel cell facing the flame provided by the furnace, while a cathode side thereof faces the first ventilation channels of the heat shield structure;
    a housing structure, covering the heat shield structure and including a plurality of second ventilation channels; and
    a pad structure being located between the housing structure and the heat shield structure so as to form a thermal insulation gap, air required by cathodes of the metal-supported solid oxide fuel cells flowing to the cathodes of the metal-supported solid oxide fuel cells through the second ventilation channels, the thermal insulation gap and the first ventilation channels;

wherein the furnace uses a liquefied gas as a fuel and heat source;

wherein the metal-supported solid oxide fuel cells are supported by porous metal substrates with a plurality of straight gas channels that penetrate porous plate bodies of the porous metal substrates and that do not penetrate porous surface layers of the porous metal substrates.

2. The portable flame electric generation device of claim 1, further including:

a high temperature ceramic adhesive and high temperature ceramics plates, the metal-supported solid oxide fuel cells being connected by the high temperature ceramic adhesive or by the high temperature ceramic adhesive and the high temperature ceramic plates, wherein the high temperature ceramic adhesive and the high temperature ceramic plates are used in a temperature less than 1300° C., the high temperature ceramic adhesive serves both connection and sealing functions and the high temperature ceramic plates are $Al_2O_3$ or $ZrO_2$ plates.

3. The portable flame electric generation device of claim 1, wherein the metal-supported solid oxide fuel cells are located to surround the flame or surround the flame and be above the flame.

4. The portable flame electric generation device of claim 3, further including:

a top metal plate, located over the flame provided by the furnace, wherein the top metal plate is a metal plate made of crofer 22, ZMG232, or a ferritic stainless steel containing Cr.

5. The portable flame electric generation device of claim 4, wherein the top metal plate includes a room or space for accommodating one of the plural metal-supported solid oxide fuel cells.

6. The portable flame electric generation device of claim 1, further including:

a support structure, located between the heat shield structure and the furnace, to support the heat shield structure and the plurality of metal-supported solid oxide fuel cells above the furnace.

7. The portable flame electric generation device of claim 1, wherein the furnace includes a fuel tank, a control switch, a fuel delivery device, an air mixer for mixing air with fuel, a voltage/current monitor, a plug-type charging connector and a USB charging connector, the fuel tank being to supply a fuel, the fuel tank being connected with the fuel delivery device, the air mixer being located close to the fuel delivery device, the control switch being to ignite the flame and to control a flow rate of the fuel, the voltage/current monitor being to display an output voltage, an environmental temperature around the metal-supported solid oxide fuel cells and the flow rate of the fuel, the plug-type charging connector or the USB charging connector being to supply electric power.

8. The portable flame electric generation device of 7, further including:

a base, located on the furnace, communicated in space with the fuel delivery device, being to convey the fuel inside the fuel delivery device into the heat shield structure; and an igniter, located on the furnace, electrically connected with the control switch.

9. The portable flame electric generation device of claim 7, further including:

a thermometer, located on the furnace, electrically coupled with the voltage/current monitor, being to detect the environmental temperature around the metal-supported solid oxide fuel cells and then to display the measured environmental temperature on the voltage/current monitor.

10. The portable flame electric generation device of claim 1, wherein a metallic anode current collector is located to the anode side of each said metal-supported solid oxide fuel cell, and a metallic cathode current collector is located to the cathode side of each said metal-supported solid oxide fuel cell.

11. The portable flame electric generation device of claim 10, further including:

a mesh holder, being to mount the metallic anode current collector and the metallic cathode current collector to the corresponding anode and cathode of metal-supported solid oxide fuel cell.

* * * * *